US010685300B2

(12) United States Patent
Leclercq et al.

(10) Patent No.: US 10,685,300 B2
(45) Date of Patent: Jun. 16, 2020

(54) LOCATION AWARE WAITING QUEUE

(71) Applicant: Facebook, Inc., Menlo Park, CA (US)

(72) Inventors: Guy Gregoire Nicolas Leclercq, Los Altos, CA (US); Laurent Gabriel Stephane Charignon, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 495 days.

(21) Appl. No.: 15/452,684

(22) Filed: Mar. 7, 2017

(65) Prior Publication Data

US 2018/0260863 A1    Sep. 13, 2018

(51) Int. Cl.
*G06Q 10/06* (2012.01)
*H04W 4/02* (2018.01)
*G06Q 30/06* (2012.01)
*G06Q 50/00* (2012.01)

(52) U.S. Cl.
CPC .......... *G06Q 10/06311* (2013.01); *G06Q 10/063116* (2013.01); *G06Q 30/0613* (2013.01); *G06Q 50/01* (2013.01); *H04W 4/02* (2013.01)

(58) Field of Classification Search
None
See application file for complete search history.

(56) References Cited

U.S. PATENT DOCUMENTS

| 7,865,386 B2* | 1/2011 | Sarkar | G06Q 10/06311 705/7.16 |
| 7,941,133 B2* | 5/2011 | Aaron | G06Q 10/109 455/418 |
| 7,974,873 B2* | 7/2011 | Simmons | G06Q 10/06313 705/7.29 |
| 9,049,542 B1* | 6/2015 | Adams | H04W 64/00 |
| 9,064,359 B2* | 6/2015 | Lert, Jr. | G06Q 30/016 |
| 9,243,911 B2* | 1/2016 | Coughlin | G01C 21/20 |
| 9,514,422 B2* | 12/2016 | Argue | G06Q 10/02 |
| 9,767,420 B2* | 9/2017 | Argue | G06Q 10/02 |
| 10,318,968 B2* | 6/2019 | Tineo | G06Q 30/0201 |
| 2006/0147005 A1* | 7/2006 | Taub | G06Q 10/00 379/114.2 |
| 2007/0282654 A1* | 12/2007 | Sarkar | G06Q 10/063116 705/7.16 |
| 2008/0195312 A1* | 8/2008 | Aaron | G06Q 10/109 455/418 |
| 2009/0076875 A1* | 3/2009 | Lert, Jr. | G06Q 30/016 705/14.3 |

(Continued)

OTHER PUBLICATIONS

Enis, M., "NetObjex Enters Beacon Market," Library Journal, 140.8, May 1, 2015. (Year: 2015).*

*Primary Examiner* — Nicolas D Rosen
(74) *Attorney, Agent, or Firm* — Baker Botts L.L.P.

(57) ABSTRACT

Particular embodiments may receive, from a first client device, registration information for a service to be provided at a service location. Particular embodiments may add the first client device to a waiting queue for the service, wherein the waiting queue comprises one or more client devices. Particular embodiments may determine a target service time for the first client device based on location information received from the first client device and status information received from the client devices in the queue. Finally, particular embodiments may send, to the first client device, a notification regarding the target service time.

16 Claims, 14 Drawing Sheets

(56) References Cited

U.S. PATENT DOCUMENTS

| | | | |
|---|---|---|---|
| 2009/0228325 A1* | 9/2009 | Simmons | G06Q 10/06313 |
| | | | 705/7.23 |
| 2011/0066468 A1* | 3/2011 | Huang | G01C 21/3438 |
| | | | 705/7.19 |
| 2012/0158293 A1* | 6/2012 | Burnham | G01C 21/20 |
| | | | 701/439 |
| 2012/0302256 A1* | 11/2012 | Pai | G01S 5/0072 |
| | | | 455/456.2 |
| 2014/0114571 A1* | 4/2014 | Coughlin | G01C 21/20 |
| | | | 701/526 |
| 2014/0297420 A1* | 10/2014 | Patel | G06Q 30/0633 |
| | | | 705/14.64 |
| 2015/0156567 A1* | 6/2015 | Oliver | H04W 4/80 |
| | | | 340/870.07 |
| 2015/0178687 A1* | 6/2015 | Dasari | G06Q 10/1095 |
| | | | 705/7.19 |
| 2015/0371197 A1* | 12/2015 | Mermelstein | G06Q 10/1095 |
| | | | 705/7.19 |
| 2015/0379434 A1* | 12/2015 | Argue | G06Q 10/02 |
| | | | 705/5 |
| 2017/0039490 A1* | 2/2017 | Argue | G06Q 10/02 |
| 2017/0124526 A1* | 5/2017 | Sanderford | G06Q 10/1095 |
| 2017/0352043 A1* | 12/2017 | Tineo | G06Q 30/0201 |
| 2018/0260792 A1* | 9/2018 | Leclercq | G06Q 10/1097 |
| 2018/0260849 A1* | 9/2018 | Leclercq | G06Q 30/0261 |
| 2018/0260864 A1* | 9/2018 | Leclercq | G06Q 30/0613 |

* cited by examiner

LOCATION AWARE WAITING QUEUE

TECHNICAL FIELD

This disclosure generally relates to queue management systems.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a computing device may receive registration information for a service from a client device. The computing device may add the client device to a waiting queue for the service to be provided and determine a target service time for the added client device based on location information received from the added client device and status information received from the client devices in the queue. The computing device may send a notification regarding the target service time to the client device. The computing device may also send a notification regarding events at nearby locations to the client device. As an example and not by way of limitation, John, a customer, may send registration information for an oil change for his car to a computing device at a service center using his mobile phone. The computing device may add John's phone to the waiting queue and compute a target service time for John's car based on status information received from the other waiting customers' devices. The computing device may send a notification regarding the target service time and a promotional offer from a cafeteria located in the service center. If John then goes to the cafeteria, the target service time may be updated based on the expected time that John will spend at the cafeteria.

In particular embodiments, a computing device may receive registration information for a service to be provided to a first customer from a client device. The first customer is associated with the client device. The computing device may obtain information regarding the first customer. The computing device may add the client device to a waiting queue for the service. The computing device may provide collected service information and first customer information to a service provider so that the service provider may be ready for the service properly. The computing device may send a notification regarding events at nearby locations to the client device, where the events may be selected based on the first customer information. As an example and not by way of limitation, when Tom, a customer, may want to return his bike to the merchant shop. A computing device at the merchant shop may receive registration information for the bike return from Tom's mobile device. The computing device may receive a photo showing a barcode of the bike to be returned from Tom's mobile device and may provide the photo to an employee of the shop. The employee may be ready to process the return more quickly based on the retrieved information from the barcode. In particular embodiments, the computing device may retrieve detail information from the barcode and provide the retrieved detail information to the employee. As another example and not by way of limitation, the computing device may obtain purchase history records of Tom from a database, and the purchase history records may indicate that Tom is interested in Remote Control (RC) cars. The computing device may provide the obtained purchase history records with summary information to an employee so that the employee may trigger sending information regarding an RC cars discount event to Tom's mobile device. In particular embodiments, the computing device may send such information to Tom's mobile device without interacting with an employee.

In particular embodiments, a first computing device belonging to a first merchant may receive registration information for a service to be provided to a customer from a client device, where the customer is associated with the client device. The first computing device may compute a target service time for the service as explained above. The first computing device may share the registration information and the target service time with another computing device belonging to a second merchant by sending the registration information and the target service time to a second computing device. In particular embodiments, the second computing device may belong to the second merchant. In particular embodiments, the second computing device may be a shared data storage manager. The first computing device may send notifications regarding the target service time, as well as notifications regarding events at nearby locations to the client device. In this scenario, the first computing device may select the events at nearby locations that are relevant to the customer based on accessible customer records. The first computing device may also receive information about events taking place at locations near by the second computing device. As an example and not by way of limitation, Jane, a customer, may return a bed frame to a furniture store. A first computing device belonging to the furniture store may receive registration information from Jane's mobile phone and may share the information with a second computing device belonging to a hardware store. The fact that Jane recently bought a bed frame may indicate that Jane has recently moved to a new place. The second computing device belonging to the hardware store may send information about promotional offers for people who have recently moved to Jane's mobile phone. In particular embodiments, the second computing device may send the notification regarding the promotional offers to Jane's mobile phone directly. In particular embodiments, the second computing device may send the notification regarding the promotional offers to the first computing device. Then, the first computing device may relay the notification regarding the promotional offers to Jane's mobile phone.

In particular embodiments, a computing device may obtain a list of tasks for a first user within a pre-determined period of time from a client device associated with the first user. For each task in the list, the computing device may collect service details (such as, by way of example and not limitation, a location of the task, a length of a waiting queue, expected waiting time, and traffic) by retrieving previous records, by communicating with a second computing device belonging to the respective merchant, or by communicating with a traffic information server. The computing device may determine a proposed schedule to perform the tasks. The computing device may send the proposed schedule to the client device. As an example and not by way of limitation, Alice, a user, has a list of tasks to do in a weekend. Those tasks are recorded on her mobile phone in various forms including calendar, To-Do list, emails, and text messages. A computing device may obtain the list of tasks by communicating with Alice's mobile phone. For each task, the computing device may retrieve previous records to figure out details such as location for a task, preferred service provider for a task, preferred day and time for a task. The computing device may determine an expected waiting time for each task by communicating with another computing device belonging to a service providing merchant for respective task. The computing device may also determine an expected travel time to the service location of each task by communicating with a traffic information server. The computing device may determine a proposed schedule to perform the tasks based on the collected information. The computing device may send the proposed schedule to Alice's mobile phone. The computing device may update the schedule as the computing device receives updates from Alice's mobile phone and the computing devices from the service providers for the tasks.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
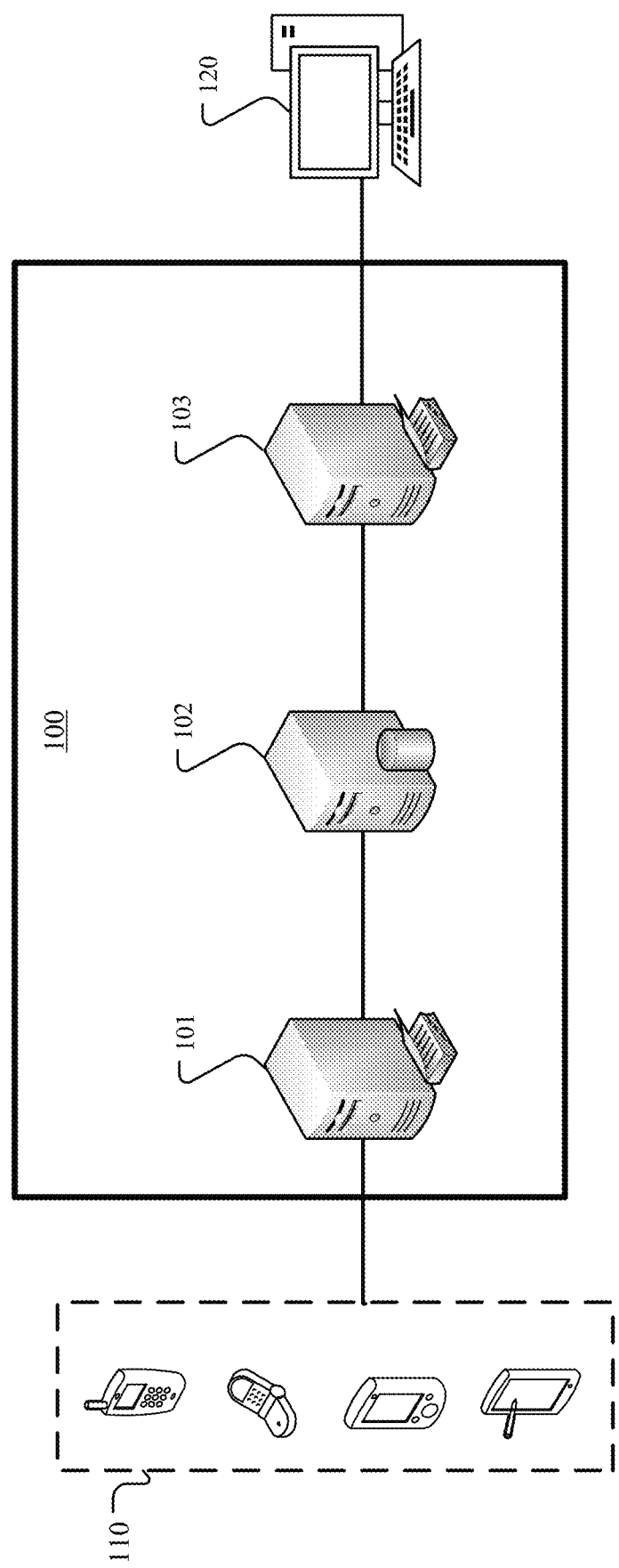
FIG. 1 illustrates an example system for managing a location-aware waiting queue.

Traditional waiting queues for people are typically first in, first out: as people enter a queue, each person progresses toward the front of the queue based on how long that person has been waiting. In certain situations, this approach may be inefficient. For example, at a returns desk at a retail merchant store, customers may be required to take a ticket and wait in the lobby before they are able to return their merchandise. Many customers may plan to spend their waiting time by shopping for more items or by eating at a cafeteria inside the store when they go to the store to return one or more items. However, some customers may leave the store without purchasing anything or eating in the cafeteria because they have spent too much time waiting to return an item.

In particular embodiments, a computing device may place a customer in a waiting queue after receiving a registration request for a service from the customer. The customer may use a mobile client device to communicate with the computing device. Then, the computing device may track the location of the customer within a store using a Global Positioning System (GPS) unit located in the mobile client device of the customer and may rank customers in the queue based on their respective locations. The computing device may be located at the store or on a server hosted by a social networking service provider. The queue may be referred to as a location-based queue. For example, a computing device may be managing a location-based queue for a returns desk at a furniture store. A customer who is browsing in a living room section near the back of the store may receive a low ranking, because it is likely that the customer will take a while to make his way back to the front of the store (where the returns desk is located) while he tries sitting on all the sofas in the living room section. But a customer who is in a self-service furniture section near the front of the store may be moved up toward the front of the queue, because she is likely to find her furniture and proceed to check out soon. Once a customer has checked out and paid for her merchandise, she may be moved up even higher in the queue, because she may go straight to the returns desk from the check-out aisle. Through such means, queue management may allow customers to spend their time more efficiently because customers who are ready to return merchandise may be moved to the front of the queue, while customers who are still shopping may be pushed back in the queue.

In particular embodiments, the computing device may be notified that a customer has just purchased a large meal at a cafeteria inside the store. The customer is likely to spend 20-30 minutes eating that meal. The computing device may move the customer toward the back of the queue. If, however, the customer merely purchases something small from the cafeteria (e.g., a chocolate milk), the computing device may not move the customer toward the back of the queue. If the customer moves from the cafeteria back to the returns desk, the computing device may detect this and may move the customer toward the front of the queue because the customer is ready to return her merchandise. By managing the queue dynamically based on the customer's location and/or status, the computing device may cut down on customer wait times.

FIG. 1 illustrates an example system for managing a location-aware waiting queue. A service gateway 100 may consist of three functional components: a customer-facing interface 101, a queue controller 102, and a merchant-facing interface 103. The customer-facing interface 101 may communicate with a number of client systems 110 associated with customers. The queue controller 102 may place customers into a location-aware waiting queue and adjust the positions of the customers based on at least the locations of the customers. The merchant-facing interface 103 may communicate with one or more merchant computing devices 120. The merchant computing devices may include, for example but not limited to, employees' handheld devices, a customer database system, an events and promotions database system, and an intelligent data analysis system. The merchant-facing interface 103 may provide information regarding customers in the location-aware waiting queue to personnel working at the merchant and may retrieve customer information or promotion information. The merchant-facing interface 103 may receive tailored offers for a customer from an intelligent data analysis system. The intelligent data analysis system may include a big data analysis system.

FIGS. 2A-2D illustrate an example location-based queue at a furniture store. In this example, a furniture store 200 has a furniture showroom area 210, a cafeteria 220, checkout counters 230, and a returns desk 240. The figure does not show the rest of the store for the sake of brevity. A service gateway at the store may maintain a waiting queue, 250, for customers with returning items. The customers may register with the service gateway for their planned return using their mobile devices when they enter the store. In an example scenario depicted in FIG. 2A, three customers, 201A, 201B, and 201C, are waiting to return items in front of the returns desk, 240. The waiting queue 250 may have 3 entries for customers 201A, 201B, and 201C. Another customer 201D may enter the store to return a merchandise and may register with the service gateway for the returning merchandise. The service gateway may add customer 201D to the waiting queue 250 and may calculate a target service time for customer 201D. The service gateway may notify the customer 201D of an estimated waiting time for the registered return service such as, for example, "Your approximate wait time is 15 minutes." The service gateway may also send a message to customer 201D introducing one or more events at the store such as, for example, "We are offering 20% off on selected items in the furniture section. Why not take a look at the them? We'll move you to the front of the line when you return." The service gateway may incentivize customer 201D to purchase something at the furniture section 210 by doing this.

Figure 2A:
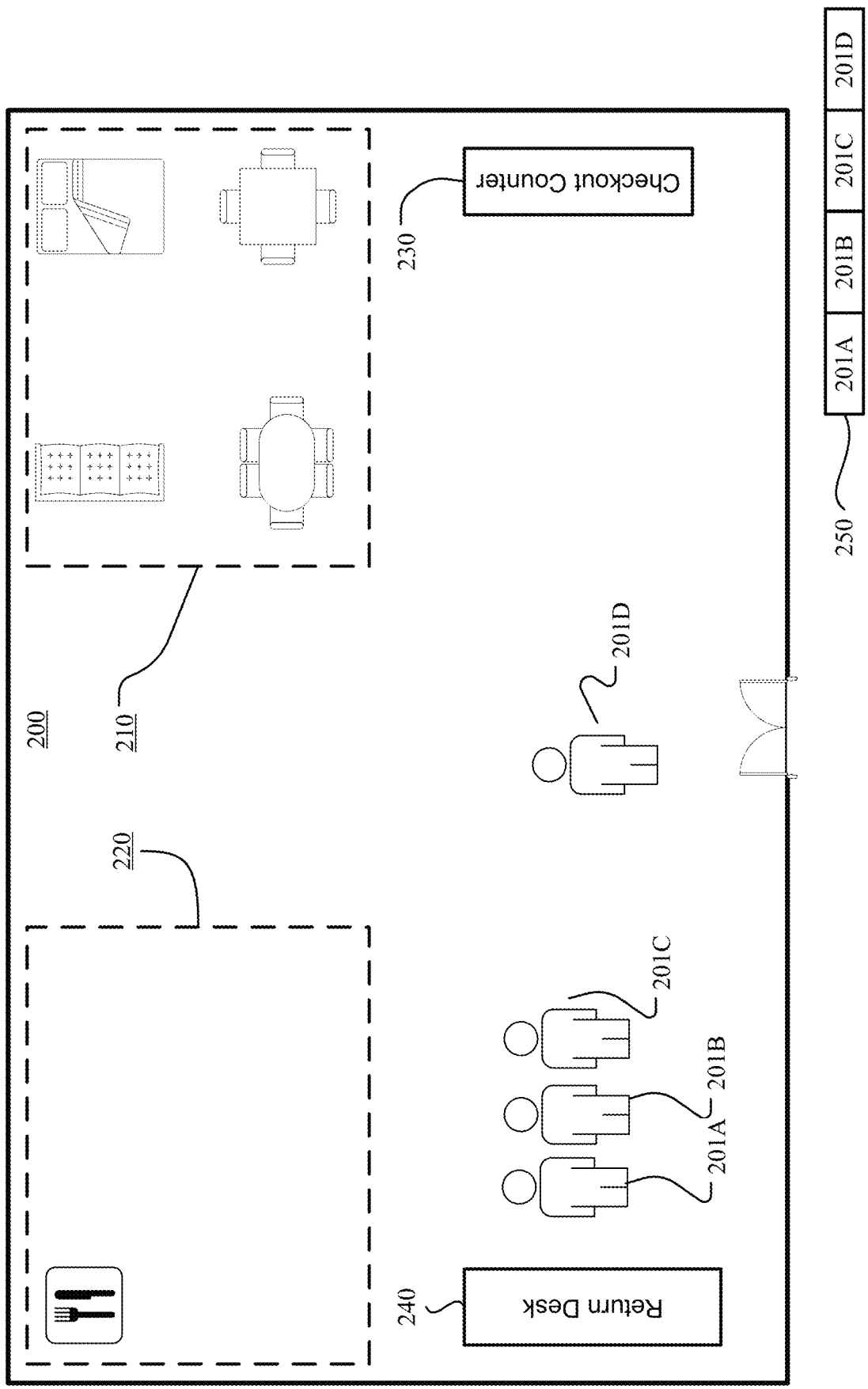
FIGS. 2A-2D illustrate an example location-based queue at a furniture store.
Figure 2B:
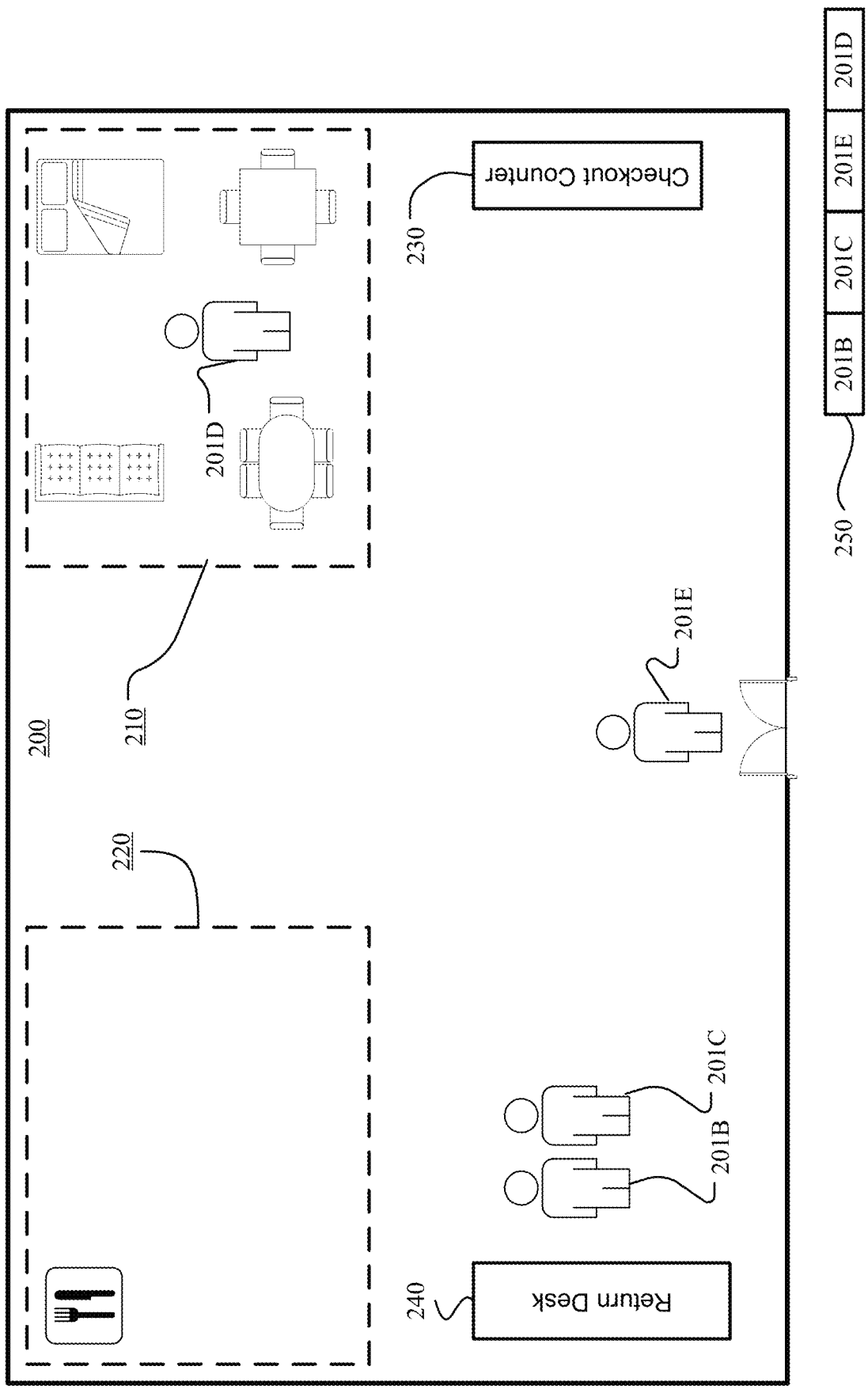

FIG. 2B illustrates an example scenario that is continued from the scenario depicted in FIG. 2A. Customer 201A has left the store after returning the merchandise. Customer 201D has moved to the furniture section 210 to take a look at a sofa after receiving a message from the service gateway regarding the discount event. A new customer 201E may enter the store for an item return and may perform registration with the service gateway using a mobile device. The service gateway may add customer 201E into the waiting queue 250 and adjust the position of customer 201E based on the current status of the customers in the waiting queue 250 and the status of the new customer 201E. Because customer 201D is likely to spend time testing sofas in the furniture showroom section, the service gateway may put customer 201E ahead of customer 201D in the waiting queue. Then, the service gateway may calculate an estimated service time for customer 201E and may send a notification to customer 201E such as, for example, "Your approximate waiting time is 12 minutes." The service gateway may also send a message to customer 201E introducing one or more events at the store such as, for example, "Today's special at the cafeteria is Swedish meatballs. Why not grab some Swedish meatballs at the cafeteria? We'll move you to the front of the line when you return." The service gateway may incentivize customer 201E to purchase something at the cafeteria 220 by doing this.

Figure 2C:
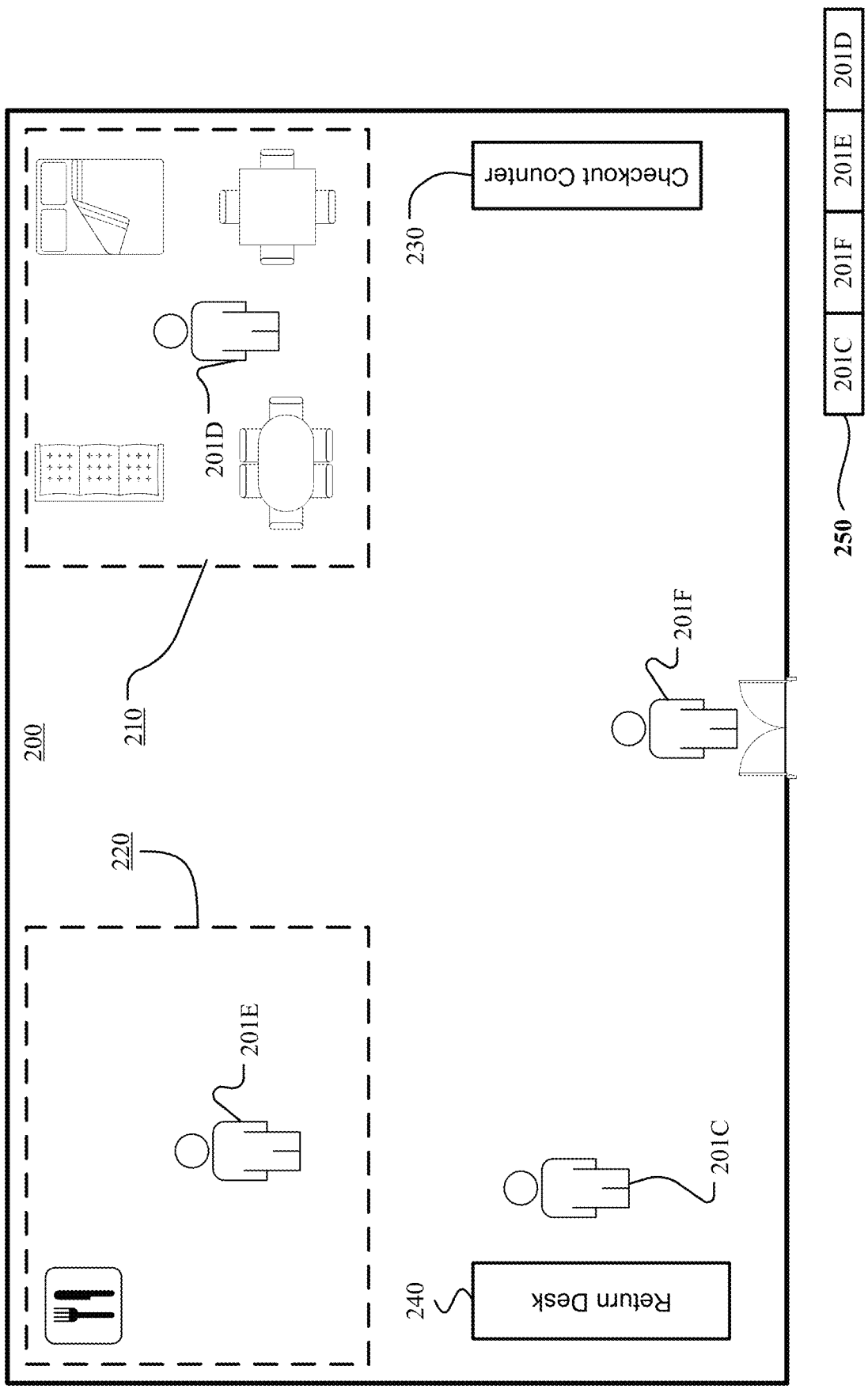

FIG. 2C illustrates an example scenario that is continued from the scenario depicted in FIG. 2B. Customer 201B has finished the returning a merchandise. Customer 201E has moved to the cafeteria 220 to have a light snack. A new customer 201F may register with the service gateway for a merchandise return in the meantime. The service gateway may add the customer 201F to the waiting queue 250 and adjust the position of the customer 201F based on current status of the customers in the waiting queue and the status of the customer 201F. Because only customer 201C is being served at the returns desk, and customers 201E and 201D are not likely to come back to the returns desk before customer 201C finishes her return, the service gateway may put customer 201F in front of customers 201E and 201D in the waiting queue 250. The service gateway may calculate an estimated service time for customer 201F and send a notification such as, for example, "Your approximate waiting time is 5 minutes." to customer 201F.

Figure 2D:
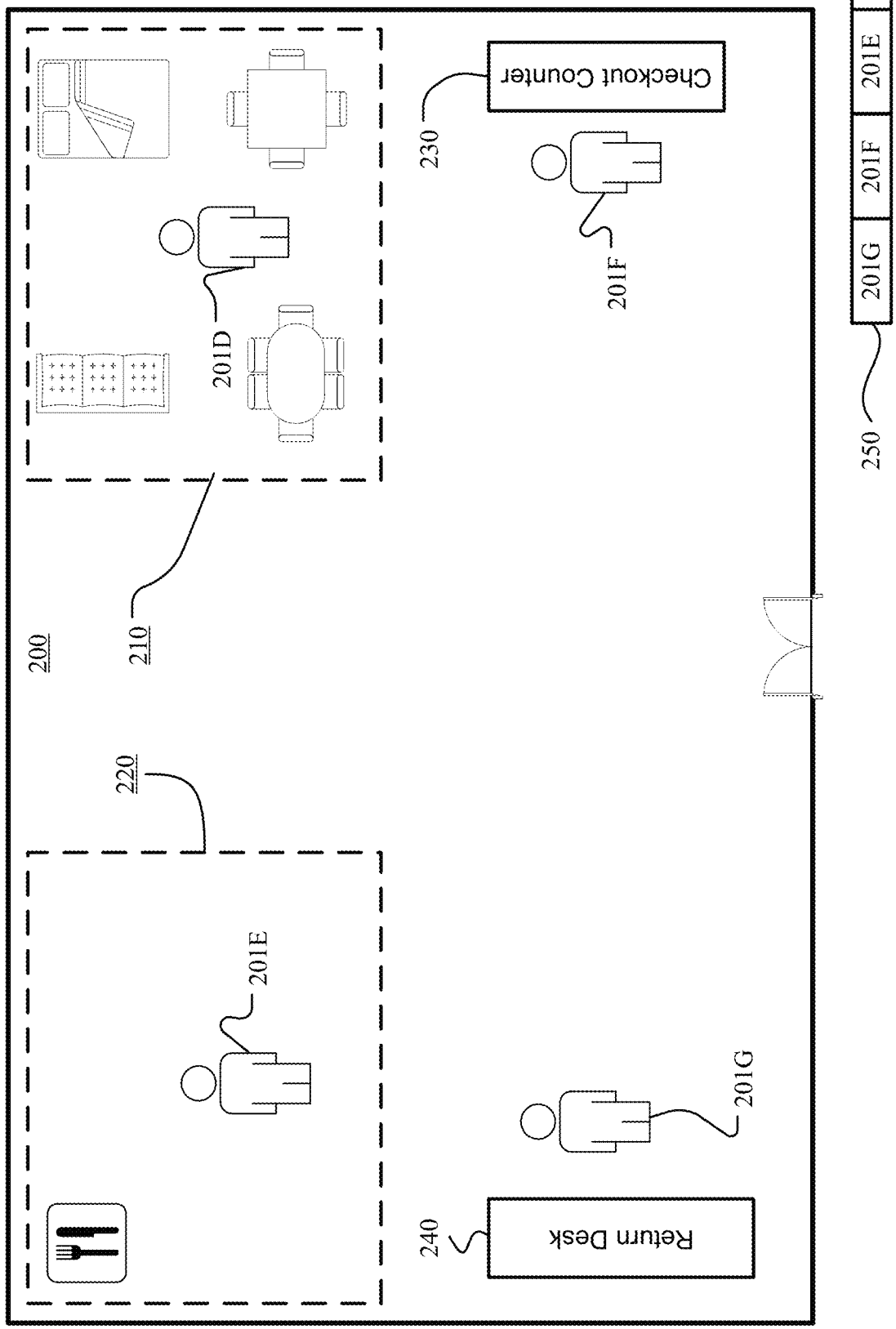

FIG. 2D illustrates an example scenario that is continued from the scenario depicted in FIG. 2C. Customer The 201C has finished the item return. Customer 201F may be picking up a bottle of soda from a refrigerator next to a checkout counter. A new customer 201G may register with the service gateway for a return while customer 201F is purchasing her soda. Because no customer is being served at the returns desk and no customer is waiting in front of the returns desk when customer 201G registers, the service gateway may put customer 201G to the front of the waiting queue 250 and may call customer 201G for an immediate return service. The service gateway may adjust the positions of the other customers in the waiting queue based on current status of the customers. The service gateway may adjust the positions of the customers in the waiting queue whenever the status of any customer changes. In particular embodiments, the user status information may include, by way of example and not limitation, information regarding a shopping list for the user, a calendar of events for the user, or an indication of whether or not the user is alone. Although FIGS. 2A-2D illustrate example scenarios where a location-based queue is managed based on status of the customers in a particular manner, this disclosure contemplates managing a location-based queue based on status of the customers in any suitable manner.

Figure 3:
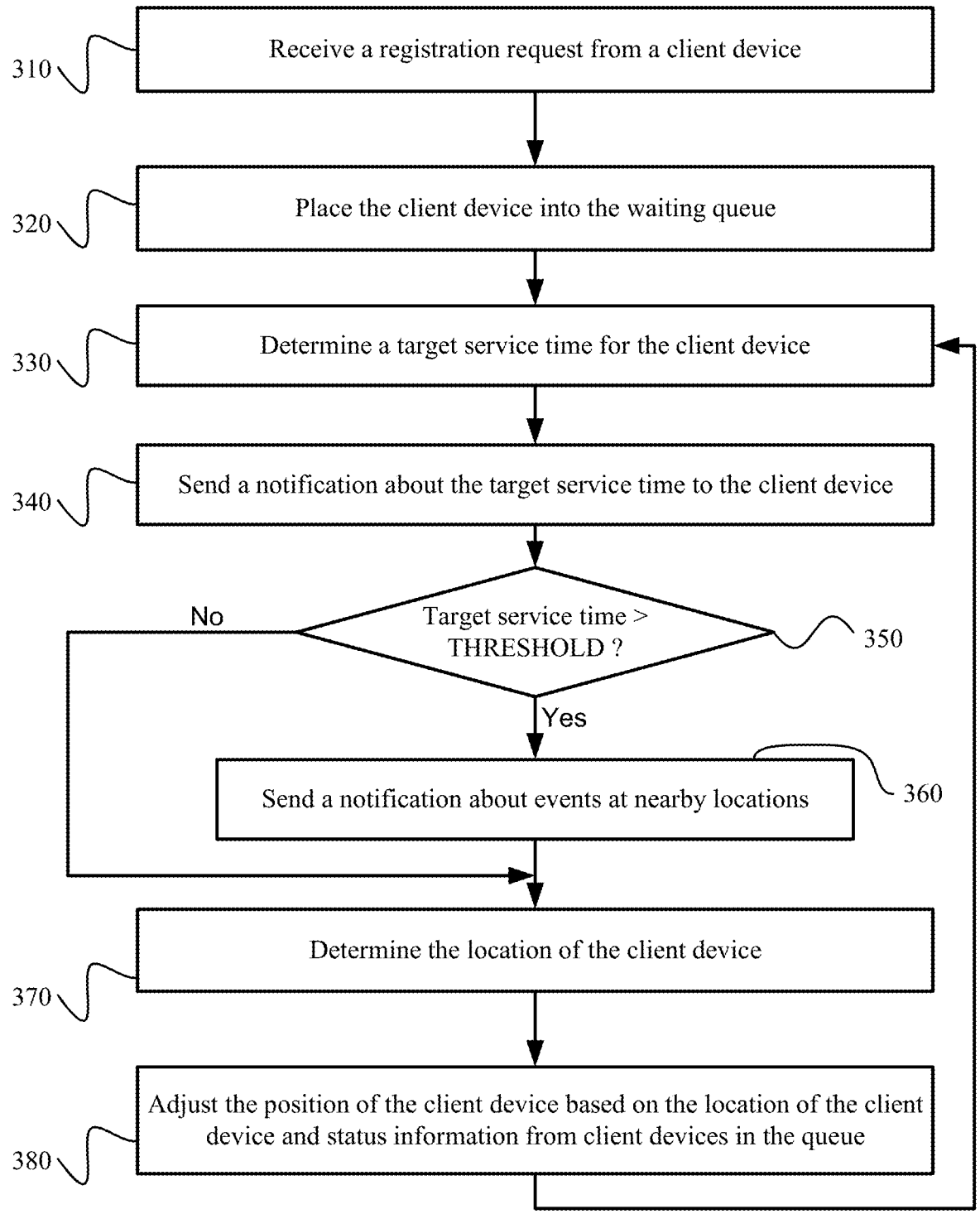
FIG. 3 illustrates an example method for managing a location-aware waiting queue.

FIG. 3 illustrates an example method 300 for managing a location-aware waiting queue. The method may begin at step 310, where a computing device may receive a registration request from a client device. The computing device may be a service gateway belonging to a merchant. At step 320, the computing device may place the client device into the waiting queue. At step 330, the computing device may determine a service time for the client device. At step 340, the computing device may send a notification regarding the target service time to the client device. At step 350, the computing device may determine if the target service time is larger than a pre-determined threshold. If the target service time is larger than the pre-determined threshold, the computing device, at step 360, may send a notification regarding events at nearby locations to the client device. At step 370, the computing device may determine the location of the client device. At step 380, the computing device may adjust the queue position of the client device based at least on the determined location of the client device and status information from other client devices in the queue. After adjusting the position of the client device in the queue at step 380, the computing device may repeat the steps from step 330. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for managing a location-based waiting queue including the particular steps of the method of FIG. 3, this disclosure contemplates any suitable method for managing a location-based waiting queue including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, a computing device may receive, from a client device, registration information for a service to be provided at a service location. When a customer wants to get a service, the customer may register with a service gateway that belongs to a merchant that provides the desired service. The customer may use an application installed on her mobile device such as, for example, a smartphone or tablet computer for the registration. The address of the service gateway and the used protocols may be configured on the application. Thus the customer may not need to know such details for registration. As an example and not by way of limitation, Jane, a customer, may want to return a lamp she bought from a furniture store. Jane may register for the return using an application on her smartphone as she enters into the furniture store. In particular embodiments, the application may have been provided by the furniture store or by a service provider for the furniture store. The address of the service gateway and protocols may be pre-configured on the application. In particular embodiments, the application may have been released by a social-networking service provider. The social-networking service provider may have established an agreement with the furniture store to handle such a registration on behalf of the furniture store. Although this disclosure describes receiving registration information in a particular manner, this disclosure contemplates receiving registration information in any suitable manner.

Figure 4:
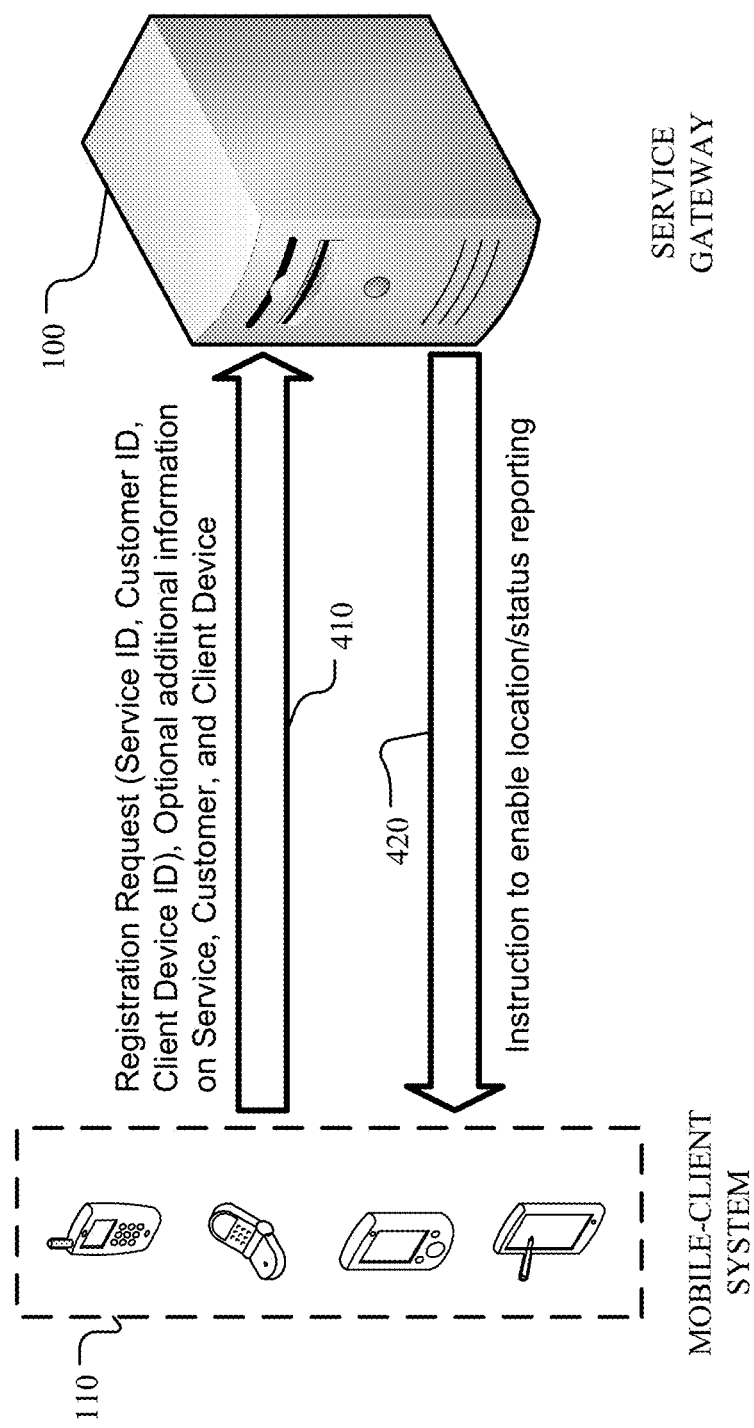
FIG. 4 illustrates an example registration transaction between a mobile client device and a service gateway.

FIG. 4 illustrates an example registration transaction between a mobile client device and a service gateway. A mobile client device 110, during registration, may send a registration request over a communication channel 410. The registration request may be sent from the mobile client device 110 to a service gateway 100. In particular embodiments, a registration request may comprise identification information of the desired service, identification information of a customer requesting the service, identification information of the mobile client device that is being used for communication, or any suitable combination thereof. In particular embodiments, the mobile client device 110, during registration, may send additional information about the service, the customer, the client device, or any suitable combination thereof on the communication channel 410 upon receiving a request from the service gateway 100. In particular embodiments, the mobile client device 110, during registration, may send additional information about the service, the customer, the client device, or any suitable combination thereof on the communication channel 410 even without receiving a request from the service gateway 100. The service gateway 100, during registration, may send an instruction to enable location reporting and/or status reporting to the mobile client device 110 over a communication channel 420 that is from the service gateway 100 to the mobile client device 110. In particular embodiments, media for the communication channel 420 may be different from media for the communication channel 410. As an example and not by way of limitation, continuing with the prior example, Jane may provide input on the application on her smartphone indicating that she wants to return a lamp. The application may send a registration request to a service gateway 100 belonging to the furniture store comprising the service information (e.g., returning a lamp), customer information that is Jane's profile stored in the application, and the client device information (e.g., phone number, IP address of the smartphone, or unique identifier assigned to the application). Upon receiving the registration request, the service gateway 100 may send an instruction to enable location reporting to Jane's smartphone. Although this disclosure describes exchanging information with a mobile client device 110 for registration in a particular manner, this disclosure contemplates exchanging information with a mobile client device 110 for a registration in any suitable manner.

In particular embodiments, the computing device may send a command to enable location reporting to the client device 110. The command may instruct the client device 110 to make itself discoverable to Bluetooth Low Energy (BLE) beacons in a pre-determined area. The computing device may need to identify the current location of the client devices in the waiting queue in order to manage the queue in a location-based manner. For this purpose, the computing device may instruct a client device 110 to make itself discoverable to BLE beacons in a pre-determined area. A client device 110 may turn on a BLE radio on the client device 110 on receiving the command from the computing device. A beacon message from a BLE beacon node contains a Universally Unique Identifier (UUID) that identifies a specific location inside the store. In particular embodiments, the client device 110 may report the received beacon message to the computing device, then the computing device may determine the current location of the client device 110. In particular embodiments, the client device 110 may transmit a BLE beacon message periodically, wherein a UUID was assigned to the client device 110 by the computing device during the registration. A number of BLE nodes may be deployed in various locations in the store. A BLE node deployed at a particular location of the store may receive the BLE beacon message from the client device 110 and may report the reception of the beacon message to the computing device. The computing device may determine the current location of the client device 110 based on the particular location of the deployed BLE node that received the beacon from the client device 110. As an example and not by way of limitation, continuing with the prior example, the store may be equipped with BLE beacon nodes, and Jane's smartphone may also be capable of receiving and/or transmitting BLE beacon messages. The service gateway may determine whether Jane's smartphone is capable of BLE beacon based on received client device information during the registration. The service gateway may send a command to instruct Jane's smartphone to make itself discoverable to BLE beacons in the vicinity of the store. Although this disclosure describes determining the location of a client device 110 based on BLE beacon in a particular manner, this disclosure contemplates determining the location of a client device 110 based on BLE beacon in any suitable manner.

In particular embodiments, the computing device may send a command to enable location reporting to the client device 110. The command may instruct the client device 110 to continually transmit the location information of the client device 110. On receiving the command, the client device 110 may periodically determine its current location and may report the determined location information to the computing device until the client device 110 receives a command to stop reporting or the client device 110 leaves the pre-determined area such as, for example, the vicinity of the store. As an example and not by way of limitation, continuing with the prior example, the store may not be equipped with BLE beacon nodes, or Jane's smartphone may not be capable of receiving and/or transmitting BLE beacon messages, or BLE beacon may not be a preferred method of the service gateway for determining location of client devices. The service gateway may send a command to Jane's smartphone that instructs it to continually transmit the location information of the client device 110. The command may also comprise instructions regarding how to determine the location. Although this disclosure describes sending a command to instruct a client device 110 to continually transmit the location information of the client device 110 in a particular manner, this disclosure contemplates sending a command to instruct a client device 110 to continually transmit the location information of the client device 110 in any suitable manner.

In particular embodiments, the location information may comprise coordinates based on Global Positioning System (GPS) satellite signals. As an example and not by way of limitation, continuing with the prior example, Jane's smartphone may be able to determine the coordinates based on received GPS satellite signals. In this case, Jane's smartphone may periodically report the determined coordinates based on received GPS satellite signals to the service gateway. In particular embodiments, the location information may comprise coordinates based on an Indoor Positioning System (IPS) protocol. As another example and not by way of limitation, continuing with the prior example, Jane's smartphone may be able to determine coordinates inside a building using radio waves, magnetic fields, acoustic signals, or other sensory information collected by itself. Jane's smartphone may periodically report the determined coordinates based on any of GPS technologies to the service gateway. Although this disclosure describes determining coordinates of the client device 110 in a particular manner, this disclosure contemplates determining coordinates of the client device 110 in any suitable manner.

In particular embodiments, the computing device may add the client device 110 to a waiting queue for the service, where the waiting queue comprises one or more client devices. Upon receiving a registration request from the client device 110, the computing device may add the client device 110 to the waiting queue. An information element for a client device 110 in the waiting queue may comprise customer information and service information received during the registration procedure. The computing device may use the associated information for calculating a target service time, for determining relevant events at nearby locations, for adjusting the position of the client device 110 in the queue, or for any other suitable purposes. As an example and not by way of limitation, continuing with the prior example, the service gateway may add Jane's smartphone to the waiting queue, wherein the information element for Jane's smartphone may also comprise information regarding Jane, a customer, and information regarding the lamp return, the desired service. Although this disclosure describes adding a client device 110 to a waiting queue for the service in a particular manner, this disclosure contemplates adding a client device 110 to a waiting queue for the service in any suitable manner.

In particular embodiments, the computing device may determine a target service time for the client device 110 based on location information received from the client device 110 and status information received from the client devices in the queue. In particular embodiments, the status information comprises location information. In particular embodiments, the status information comprises a notification that a client device 110 is canceling registration for the service. In particular embodiments, the status information comprises a notification that a client device 110 is being delayed for the service. In particular embodiments, the status information comprises an indication of service completion. In particular embodiments, the status information comprises an indication that a client device 110 is being serviced. To determine a target service time, the computing device may first calculate an estimated arrival time to the service location of the client device 110 based on the location information received from the client based at least on the distance between the current location and the service location. Then, the computing device may adjust the position of the client device 110 in the waiting queue by comparing the estimated arrival time of the first client device and the estimated arrival times of the other client devices in the waiting queue. The computing device may determine the target service time for the client device 110 based on the position of the first client in the waiting queue, estimated service duration for each client device 110 in the waiting queue and a number of service personnel at the service location. As an example and not by way of limitation, continuing with the prior example, the service gateway may calculate an estimated arrival time of Jane to the returns desk based on the distance between the returns desk and the current location of Jane, right in front of the entrance of the store, received from Jane's smartphone. The service gateway may adjust the position of Jane's smartphone in the waiting queue by comparing the estimated arrival time of Jane and the estimated arrival times of the other client devices in the waiting queue. The service gateway may also consider the estimated service duration for the client devices in the waiting queue. For example, the service gateway may currently have three customers in the waiting queue, Tom, John, and Jane (in order). Tom may be being served, and the estimated amount of service time for Tom may be 5 minutes. If the estimated arrival time of John, a customer originally positioned ahead of Jane in the waiting queue, is 10 minutes, and the estimated arrival time of Jane is 1 minute, the service gateway may adjust the position of Jane ahead of John because when Tom finishes his service, John may not be at the returns desk. If the estimated arrival time of John is 4 minutes, then the service gateway may not adjust the position of Jane because John is likely to be at the returns desk when Tom finishes his return. The service gateway may determine the target service time for Jane based on the position of Jane in the waiting queue, estimated service duration for each client device 110 in the waiting queue and a number of service personnel at the service location. Although this disclosure describes determining a target service time for a client device 110 in a particular manner, this disclosure contemplates determining a target service time for a client device 110 in any suitable manner.

In particular embodiments, the computing device may calculate the estimated arrival time of the client device 110 further based on an estimated time to complete the current activity. The current activity may be associated with the location indicated in the location information received from the first client device. As an example and not by way of limitation, continuing with the prior example, if Jane has just ordered a snack at a cafeteria in the store, the service gateway may re-calculate the estimated arrival time of Jane to the returns desk by considering the amount of time to eat the snack. In particular embodiments, the computing device may determine the current activity a customer is involved in based on the location information. In particular embodiments, the service gateway may determine the current activity a customer is involved in based on additional information related to the current activity (e.g., the location information). In particular embodiments, the service gateway may determine the current activity the customer is involved in based on information from a third-party device. As another example and not by way of limitation, continuing with the prior example, the service gateway may receive information regarding the snack Jane has just purchased from a Point of Sale (POS) system at the cafeteria. Although this disclosure describes calculating the estimated arrival time of a client device 110 in a particular manner, this disclosure contemplates calculating the estimated arrival time of a client device 110 in any suitable manner.

In particular embodiments, the computing device may send, to the client device 110, a notification regarding the target service time once the computing device determines the target service time for the client device 110. The computing device may re-send, to the client device 110, a notification regarding the target service time when the computing device re-calculate the target service time and the new target service time is considerably different from the previously notified target service time. As an example and not by way of limitation, continuing with the prior example, the service gateway may send a notification to Jane's smartphone such as, for example, "Your approximate waiting time is 10 minutes." Although this disclosure describes sending a notification regarding the target service time in a particular manner, this disclosure contemplates sending a notification regarding the target service time in any suitable manner.

In particular embodiments, the computing device may send, to the first client device, a notification regarding events at nearby locations. The notification may be accompanied with a promise to move the client device 110 to the front of the queue when the client device 110 comes back to the service location. In particular embodiments, the computing device may send, to the first client device, a notification regarding events at nearby locations if the target service time exceeds the pre-determined threshold. As an example and not by way of limitation, continuing with the prior example, the service gateway may send a notification regarding the target service time to Jane such as, for example, "Your approximate wait time is 15 minutes." Because 15 minutes is longer than a pre-determined threshold, the service gateway may send a notification regarding events at nearby locations such as, for example, "We are offering 20% off on selected items in the furniture section. Why not take a look at them?" along with a promise such as, for example, "We'll move you to the front of the line when you return." Although this disclosure describes adding a client device 110 to a waiting queue for the service in a particular manner, this disclosure contemplates adding a client device 110 to a waiting queue for the service in any suitable manner.

In particular embodiments, the computing device may send, to the first client device, a notification regarding events at nearby locations, where the notification comprises discount offers. In particular embodiments, the computing device may send, to the first client device, a notification regarding events at nearby locations, where the notification comprises promotional offers. In particular embodiments, the computing device may send, to the first client device, a notification regarding events at nearby locations, where the notification comprises advertisements. In particular embodiments, the computing device may select a few events from available events at nearby locations. In particular embodiments, the computing device may consider customer information including, but not limited to, age, sex, race, income, purchase history, activities in online social-networks, and any combination thereof to estimate the customer's current interest when the computing device selects the events at nearby locations for a customer. In particular embodiments, the computing device may receive instructions to send a notification regarding events at nearby locations to a customer from a second computing device that belongs to the merchant. The second computing device may be a big data analysis system that selects tailored events at nearby locations for a customer based on customer information including, but not limited to, age, sex, race, income, purchase history, activities in online social-networks, and any combination thereof. As an example and not by way of limitation, continuing with the prior example, the service gateway may select an event from a plurality of available events at nearby locations. The service gateway may consider various information about Jane including, but not limited to, age, sex, race, income, purchase history at the furniture store, recent activities in online social-networks, and any combination thereof in order to estimate Jane's current interest when the service gateway selects one or more events at nearby locations for Jane. The service gateway may estimate that Jane is interested in purchasing a new sofa based on the information the service gateway collected and analyzed. The service gateway may send a notification regarding a discount event in the furniture section such as, for example, "We are offering 20% off on selected items in the furniture section. Why not take a look at them? We'll move you to the front of the line when you return." Although this disclosure describes selecting events for a customer in a particular manner, this disclosure contemplates selecting events for a customer in any suitable manner.

In particular embodiments, the computing device may receive, from a second client device that is in the waiting queue, status information, where the status information comprises location information. Then, the computing device may (1) calculate an estimated arrival time of the second client device at the service location based on the status information and (2) adjust the position of the second client device in the waiting queue based on the status information received from the second client device and status information received from other client devices in the queue. In particular embodiments, the computing device may calculate an estimated arrival time at the service location of the second client device based on the distance between the current location of the second client device and the service location. In particular embodiments, the computing device may calculate the estimated arrival time of the second client device further based on an estimated time to complete a current activity being performed by the customer associated with the second client device. As an example and not by way of limitation, continuing with the prior example, the service gateway may receive location information periodically transmitted by Jane's smartphone. The service gateway may re-calculate an estimated arrival time of Jane to the returns desk. Based on the calculation, the service gateway may adjust the position of Jane in the waiting queue. Although this disclosure describes adjusting the position of a client based on received location information from the client in a particular manner, this disclosure contemplates adjusting the position of a client based on received location information from the client in any suitable manner.

In particular embodiments, the computing device may receive, from a second client device that is in the waiting queue, status information, where the status information comprises a notification that the second client device is canceling registration for the service. Then, the computing device may remove the second client device from the waiting queue. The computing device may re-calculate the target service times for the affected client devices in the waiting queue. As an example and not by way of limitation, continuing with the prior example, the service gateway may receive status information comprising a service cancellation request from John, a customer who registered a merchandise return. The service gateway may remove John from the waiting queue and re-calculate the target service times for the other client devices in the waiting queue. The service gateway may send a notification to each client device whose target service time changes considerably. Although this disclosure describes removing a client device 110 from a waiting queue when receiving a service cancellation request in a particular manner, this disclosure contemplates removing a client device 110 from a waiting queue when receiving a service cancellation request in any suitable manner.

In particular embodiments, the computing device may receive, from a second client device that is in the waiting queue, status information, where the status information comprises a notification that the second client device is being delayed for the service. Then the computing device may adjust the position of the second client device in the waiting queue based on the status information received from the second client device and status information received from the client devices in the queue. The computing device may re-calculate the target service times for the affected client devices in the waiting queue. As an example and not by way of limitation, continuing with the prior example, the service gateway may receive status information from Frank, a customer in the waiting queue, indicating that Frank would be 30 minutes late for the service. The service gateway may adjust the position of Frank in the waiting queue and re-calculate the target service times of the impacted client devices in the waiting queue. The service gateway may send notifications regarding updated target service time to the client devices whose target service times changed significantly. Although this disclosure describes adjusting the position of a client device 110 when receiving a delay notification from the client device 110 in a particular manner, this disclosure contemplates adjusting the position of a client device 110 when receiving a delay notification from the client device 110 in any suitable manner.

In particular embodiments, the computing device may receive, from a second client device that is in the waiting queue, status information, where the status information comprises an indication that the second client device is being served. Then, the computing device may adjust the position of the second client device in the waiting queue to the front of the waiting queue. The computing device may re-calculate the target service times for affected client devices in the waiting queue. The computing device may change an attribute of the second client device indicating that the second client device does not to be moved back in the waiting queue. The fact that a client device 110 is being serviced at the service location may indicate that the client device 110 is at the front of the waiting queue. Once a service is started, the client device 110 may not be moved back in the waiting queue. Thus the computing device may change the attribute of the client device 110 that the client device 110 is not to be moved back in the waiting queue. As an example and not by way of limitation, continuing with the prior example, the service gateway may receive status information from Jane indicating that Jane is being served. If Jane is not at the front of the waiting queue, the service gateway may adjust the position of Jane in the waiting queue. Also, the service gateway may change the attribute of Jane's client device 110 that Jane is not to be moved back in the waiting queue. Although this disclosure describes handling a notification from a client device 110 that the client device 110 is being served in a particular manner, this disclosure contemplates handling a notification from a client device 110 that the client device 110 is being served in any suitable manner.

In particular embodiments, the computing device may receive, from a second client device that is in the waiting queue, status information, where the status information comprises an indication of service completion. Then, the computing device may remove the second client device from the waiting queue and re-calculate target service times of the client devices in the waiting queue. As an example and not by way of limitation, continuing with the prior example, the service gateway may receive status information from Jane indicating that Jane has completed her lamp return. In particular embodiments, the service gateway may receive the service information from a third-party device such as, for example, a device of a service personnel. The service gateway may remove Jane from the waiting queue and re-calculate the target service time of the client devices in the waiting queue. The service gateway may send notifications regarding updated target service time to the client devices whose target service time changed significantly. Although this disclosure describes handling a notification from a client device 110 that the service is completed in a particular manner, this disclosure contemplates handling a notification from a client device 110 that the service is completed in any suitable manner.

A method for implementing merchant-facing queue interface is described in this disclosure to allow merchants to increase service efficiency and revenue. A merchant-facing interface may be a Software as a Service (SaaS) program that runs on an electronic device. In particular embodiments, a location-aware waiting queue may be managed by a service gateway. A service gateway consists of three functional entities: a queue controller, a customer-facing interface, and a merchant-facing interface. The merchant-facing interface may have several features that allow the merchant to understand how her customers operate, what their habits are, and how the merchant may capitalize on those habits and trends. The merchant-facing interface may also allow the merchant to decrease the service time per customer. As an example and not by way of limitation, the customer-facing interface for merchandise return service may allow a customer to take a photo of the item she wishes to return. The queue controller may recognize that item from the photo and may send detailed information (e.g., barcode, serial number) to the merchant-facing interface. The merchant-facing interface may allow an employee to prepare to process the item the customer wishes to return. In particular embodiments, customer-facing interface, merchant-facing interface, and the queue controller may be deployed on a single hardware platform. In particular embodiments, customer-facing interface, merchant-facing interface, and the queue controller may be deployed over multiple hardware platforms. In particular embodiments, customer-facing interface, merchant-facing interface and the queue controller may be deployed on a cloud.

The merchant-facing interface may also allow the merchant to respond dynamically to increases in customer return frequency. For example, if many customers register with the customer-facing interface at the same time, the queue controller may alert the merchant through the merchant-facing interface to increase personnel at the returns desk. The merchant-facing interface may allow a merchant to distribute employee labor efficiently throughout the store.

The merchant-facing interface may also enable the merchant to offer discounts, promotions, and other advertisements to the customer. As an example, if the customer registers with the customer-facing interface with the intention of returning an item, the merchant-facing interface may provide the customer information to the merchant. The merchant may send a notification such as, for example, "Your approximate wait time is 15 minutes. Why not grab some Swedish meatballs at the cafeteria? We'll move you to the front of the line when you return." The customer may purchase something at the cafeteria as she knows that she will be moved to the front of the line when she returns. The merchant may increase the revenue with this approach.

The service gateway may also collect data on the patterns of people who register with the customer-facing interface and then offer promotions, discounts, or advertisements based on those patterns. For example, the service gateway may learn that customers who return less than $100 worth of merchandise often purchase more than $100 worth of merchandise if they are serviced at the returns desk in less than five minutes. In particular embodiments, the service gateway may receive such information from another computing device through the merchant-facing interface. In particular embodiments, the service gateway may perform data analysis to draw such a conclusion. When a customer registers on the service gateway via the customer-facing interface, the customer may be asked to input the items he desires to return. The service gateway may detect that the customer plans to return less than $100 worth of merchandise. The service gateway, in response, may move the customer to the front of the queue. Or, the service gateway may send a message to the customer via the customer-facing interface that says: "Your approximate wait time is 25 minutes. Feel free to shop around the rest of the store. We'll move you to the front of the line when you get back, even if you take longer than 25 minutes." The merchant may be incentivized to do this because (1) the merchant may be able to process more returns while the customer is shopping, and (2) the customer is more likely to purchase more merchandise when she doesn't feel rushed.

Figure 5:
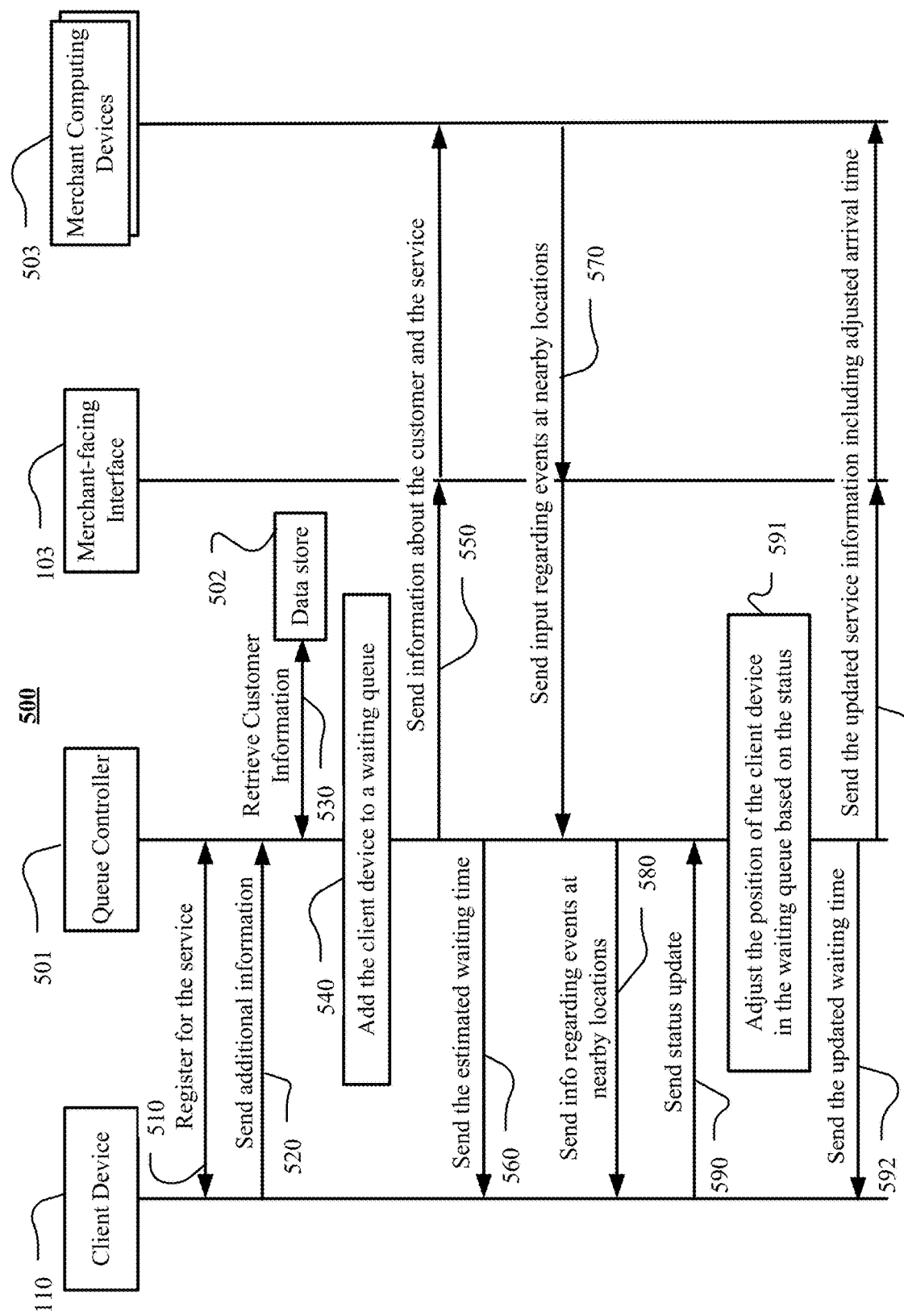
FIG. 5 illustrates an example interaction flow for implementing a merchant-facing queue interface.

FIG. 5 illustrates an example interaction flow 500 for implementing a merchant-facing interface. In this figure, a queue controller 501 represents a logical entity that is a combination of the customer-facing interface and the back-end queue controller. In particular embodiments, the customer-facing interface, and the queue controller may be deployed over multiple hardware platforms. At step 510, a queue controller 501 may perform a registration procedure triggered by a client device 110 associated with a customer 201. At step 520, the queue controller 501 may receive additional information from the client device 110. In particular embodiments, the client device 110 may send additional information by itself. In particular embodiments, the client device 110 may send additional information in response to a request from the queue controller 501. At step 530, the queue controller 501 may retrieve customer information from one or more data stores 502 using the customer identification information received during step 510 and/or 520. In particular embodiments, step 530 may be skipped. In this case, detailed customer information may be retrieved from one of the computing devices at the merchant computing systems at a later stage. At step 540, the queue controller 501 may add the client device 110 to a waiting queue 250. Note that the waiting queue 250 is not shown in this figure. At step 550, the queue controller 501 may send the details of the requested service and the customer who requested the service to one of the computing devices 503 in the merchant computing system through the merchant-facing interface 103. At step 560, the queue controller 501 may send the estimated waiting time to the client device 110. The queue controller 501 may calculate the estimated waiting time as described above before sending this notification. At step 570, the queue controller may receive input regarding events at nearby locations from one of the computing devices 503 in the merchant computing system through the merchant-facing interface 103. In particular embodiments, the queue controller 501 may select one or more events at nearby locations for the customer among the events at nearby locations received from the computing device 503 in the merchant computing system. At step 580, the queue controller 501 may send a notification regarding events at nearby locations to the client device 110. The events at nearby locations sent in the notification may be the events received from the merchant-facing interface 103 at step 570. In particular embodiments, the events at nearby locations sent in the notification may be a subset of the events received from the merchant-facing interface 103 at step 570. At step 590, the queue controller 501 may receive a status update from the client device 110. At step 591, the queue controller

501 may adjust the position of the client device in the waiting queue based on the received status information of the client device 110 and status information of the other client devices in the waiting queue. The queue controller 501 may re-calculate the estimated waiting time of the client device and the other client devices impacted by the status update at step 590. At step 592, the queue controller 501 may send a notification regarding the updated waiting time to the client device 110. The queue controller 501 may send notifications to the other client devices impacted by the status update at step 590 regarding respective updated waiting time. At step 593, the queue controller 501 may send updated service information including re-calculated arrival time of the client device at the service location to one of the computing devices 503 in the merchant computing system through the merchant-facing interface 103. If the queue controller 501 receives updated input regarding events at nearby locations from one of the computing devices 503 in the merchant computing system through the merchant-facing interface 103 at anytime, the queue controller 501 may send a notification regarding events at nearby locations to the client device 110. The steps 590 and beyond may occur repeatedly. Particular embodiments may repeat one or more steps of the method of FIG. 5, where appropriate. In this example, the estimated waiting time may be replaced with the target service time. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for implementing a merchant-facing interface including the particular steps of the method of FIG. 5, this disclosure contemplates any suitable method for implementing a merchant-facing interface including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In particular embodiments, a computing device may receive, from a client device, registration information for a service to be provided to a customer, the customer being associated with the client device. When a customer wants to get a service, the customer may register with a customer-facing interface that belongs to the service providing entity for the desired service. The service providing entity may be a merchant. The customer may use an application installed on her own mobile device such as, for example, a smartphone or tablet computer for the registration. The address of the customer-facing interface and the used protocols may be configured on the application. Thus the customer may not need to know such details for registration. As an example and not by way of limitation, Jane, a customer, may want to return a lamp she bought from a furniture store. Jane may register for the return using an application on her smartphone as she enters into the furniture store. In particular embodiments, the used application may have been released by the furniture store. The address of the service gateway and protocols may be pre-configured on the application. In particular embodiments, the application may have been released by a social-networking service provider. The social-networking service provider may have established an agreement with the furniture store to handle such a registration on behalf of the furniture store. Although this disclosure describes receiving registration information in a particular manner, this disclosure contemplates receiving registration information in any suitable manner.

In particular embodiments, the computing device may perform the following steps to receive registration information: The computing device may receive, from the client device, a registration request, wherein the registration request includes identification information for the client device, identification information for the service, and identification information for the customer. The computing device may send an instruction to enable location and/or status reporting to the client device. In particular embodiments, in response to receiving the registration request, the computing device may send, to the client device, a request for additional information. In particular embodiments, the computing device may receive, from the client device, the additional information. As an example and not by way of limitation, continuing with the prior example, Jane may provide input on the application on her smartphone that she wants to return a lamp. The application may send a registration request to a service gateway belonging to the furniture store comprising the service information (e.g., returning a lamp), customer information that is Jane's profile stored in the application, and the client device information (e.g., phone number, IP address of the smartphone, or unique identifier assigned to the application). On receiving the registration request, the service gateway may send an instruction to enable location and/or status reporting to Jane's smartphone. The service gateway may also send a request for additional information such as, for example, a photo of the lamp that is to be returned to Jane's smartphone. Jane may be alerted about the photo request from her smartphone. Thus, Jane may take a photo of the lamp on her smartphone and may send the photo to the service gateway. In particular embodiments, the service gateway may recognize the model number of the lamp from the photo or recognize the barcode of the lamp from the photo. Although this disclosure describes receiving registration information in a particular manner, this disclosure contemplates receiving registration information in any suitable manner.

In particular embodiments, the computing device may send a request for additional client device information. The additional client device information for a client device may include, by way of example and not limitation, identification information for the client device hardware model, the client device hardware version, identification information for operating system running on the client device, version information for the operating system running on the client device, identification information for the application running on the client device and communicating with the computing device, version information of the application, identification information for available communication interfaces on the client device, a preferred communication mode of the client device, or any combination thereof. As an example and not by way of limitation, continuing with the prior example, the service gateway may send a request to Jane's smartphone for the version of the application Jane is using and for the preferred method of location reporting. That additional device information is used for establishing a communication channel for further communications. Although this disclosure describes receiving particular client device information in a particular manner, this disclosure contemplates receiving any suitable client device information in any suitable manner.

In particular embodiments, the computing device may send a request for additional service information. The additional service information may be dependent on the requested service. The additional service information may include, by way of example and not limitation, a barcode information of a product to be serviced, a serial number of a product to be serviced, a photo of a product to be serviced, detailed descriptions of the service, or any combination thereof. As an example and not by way of limitation, continuing with the prior example, the service gateway may send a request to Jane's smartphone for a photo of the lamp that is to be returned. Jane may be alerted about the photo request from her smartphone. Thus, Jane may take a photo of the lamp on her smartphone and may send the photo to the service gateway. In particular embodiments, the service gateway may recognize the model number of the lamp from the photo or recognize the barcode of the lamp from the photo. Although this disclosure describes receiving particular service information in a particular manner, this disclosure contemplates receiving any suitable service information in any suitable manner.

In particular embodiments, the computing device may send a request for additional customer information. The additional customer information may comprise, but not limited to, membership status, membership identifier, name, age, gender, race, income level, address, online social-network identification information, telephone number of the customer, or any combination thereof. As an example and not by way of limitation, continuing with the prior example, the service gateway may send a request to Jane's smartphone for gender, age, and identifier on an online social network (e.g., Facebook). The service gateway may use such information to collect further information about Jane to estimate Jane's current interest with better accuracy. Although this disclosure describes receiving particular customer information in a particular manner, this disclosure contemplates receiving any suitable customer information in any suitable manner.

In particular embodiments, the computing device may obtain further customer information from one or more accessible data stores 502. For each accessible data store, the computing device may request, to the data store 502, records associated with a customer identified by the identification information of the customer received during the registration procedure. The computing device may receive, from the data store 502, the records associated with the customer. Then, the computing device may analyze the received records using one or more pre-determined analysis algorithms to produce a customer report. In particular embodiments, the one or more pre-determined analysis algorithms may comprise a big data analysis algorithm. In particular embodiments, the computing device may receive a produced customer report from the data store 502. In this case, the data store 502 may be capable of analyzing the customer records and producing the customer report. In particular embodiments, the records associated with a customer identified by the identification information may include, by way of example and not limitation, purchasing history associated with the customer, service history associated with the customer, activities of the customer in online social-networks, activities of the users who are associated with the first customer within online social-networks, records of the customers who share a particular commonality with the customer, or any combination thereof. In particular embodiments, the data store 502 is a server in a social-networking system. In particular embodiments, the data store 502 is a computing device in the merchant computing system that is accessible to the data storage. In particular embodiments, the computing device may generate a customer report comprising, but not limited to, habits of the customer, recent trend of the customer, trend of the activities of the customer in online social networks, estimated current interest of the customer, trend of the users who are associated with the customer in online social-networks, trend of the customers who share a particular commonality with the customer, or any combination thereof. As an example and not by way of limitation, continuing with the prior example, the service gateway may retrieve customer information regarding Jane from the data store 502 using Jane's customer identification information as a key. The retrieved customer information may include Jane's purchasing history, service history, Jane's recent activities in online social-networks, activities of the users who are close friends with Jane within online social-networks, records of the customers who share a particular commonality with Jane, or any combination thereof. The service gateway may produce a customer report by analyzing the retrieved customer information from the data store 502. The customer report may include, for example, but not limited to, habits of Jane, recent trend of Jane, trend of the activities of Jane in online social networks, estimated current interest of Jane, trend of the users who are close friends with Jane in online social-networks, trend of the customers who share a particular commonality (e.g., gender, age, address, or income level) with Jane, or any combination thereof. Although this disclosure describes producing a summary of a customer in a particular manner, this disclosure contemplates producing a summary of a customer in any suitable manner.

In particular embodiments, the computing device may add the client device to a waiting queue for the service, where the waiting queue comprises one or more client devices. An information element for a client device in the waiting queue may comprise customer information and service information received during the registration procedure. The computing device may use the associated information for calculating a target service time, for determining relevant events at nearby locations, for adjusting the position of the client device in the queue, or for any other suitable purposes. As an example and not by way of limitation, continuing with the prior example, the service gateway may add Jane's smartphone to the waiting queue, wherein the information element for Jane's smartphone may also comprise information regarding Jane, a customer, and information regarding the lamp return, the desired service. Although this disclosure describes adding a client device to a waiting queue for the service in a particular manner, this disclosure contemplates adding a client device to a waiting queue for the service in any suitable manner.

In particular embodiments, the computing device may determine a target service time for the client device based on location information received from the client device and status information received from the client devices in the queue. In particular embodiments, the status information comprises location information. In particular embodiments, the status information comprises a notification that a client device is canceling registration for the service. In particular embodiments, the status information comprises a notification that a client device is being delayed for the service. In particular embodiments, the status information comprises an indication of service completion. In particular embodiments, the status information comprises an indication that a client device is being serviced. To determine a target service time, the computing device may first calculate an estimated arrival time to the service location of the client device based on the location information received from the client based at least on the distance between the current location and the service location. Then, the computing device may adjust the position of the client device in the waiting queue by comparing the estimated arrival time of the first client device and the estimated arrival times of the other client devices in the waiting queue. The computing device may determine the target service time for the client device based on the position of the first client in the waiting queue, estimated service duration for each client device in the waiting queue and a number of service personnel at the service location. As an example and not by way of limitation, continuing with the prior example, the service gateway may calculate an estimated arrival time of Jane to the returns desk based on the distance between the returns desk and the current location of Jane, right in front of the entrance of the store, received from Jane's smartphone. The service gateway may adjust the position of Jane's smartphone in the waiting queue by comparing the estimated arrival time of Jane and the estimated arrival times of the other client devices in the waiting queue. The service gateway may also consider the estimated service duration for the client devices in the waiting queue. For example, the service gateway may currently have three customers in the waiting queue, Tom, John, and Jane in order. Tom may be being served and the estimated amount of service time for Tom is 5 minutes. If the estimated arrival time of John, a customer originally positioned ahead of Jane in the waiting queue, is 10 minutes and the estimated arrival time of Jane is 1 minute, the service gateway may adjust the position of Jane to a position ahead of John because John may not be at the returns desk when Tom finishes his service. If the estimated arrival time of John is 4 minutes, then the service gateway may not adjust the position of Jane because John is likely to be at the returns desk when Tom finishes his return. The service gateway may determine the target service time for Jane based on the position of Jane in the waiting queue, estimated service duration for each client device in the waiting queue and a number of service personnel at the service location. Although this disclosure describes determining a target service time for a client device in a particular manner, this disclosure contemplates determining a target service time for a client device in any suitable manner.

In particular embodiments, the computing device may calculate the estimated arrival time of the client device further based on an estimated time to complete current activity, wherein the current activity is associated with the location indicated in the location information received from the first client device. As an example and not by way of limitation, continuing with the prior example, if Jane has just ordered a snack at a cafeteria in the store, the service gateway may re-calculate the estimated arrival time of Jane to the returns desk by considering the amount of time to eat the ordered snack. In particular embodiments, the computing device may determine the current activity a customer is involved in based on the location information. In particular embodiments, the service gateway may determine the current activity a customer is involved in based on the additional information regarding the current activity the customer is involved in included in the location information. In particular embodiments, the service gateway may determine the current activity the customer is involved in based on information from a third-party device. As another example and not by way of limitation, continuing with the prior example, the service gateway may receive information regarding the snack Jane has just purchased from a Point of Sale (POS) system at the cafeteria. Although this disclosure describes calculating the estimated arrival time of a client device in a particular manner, this disclosure contemplates calculating the estimated arrival time of a client device in any suitable manner.

In particular embodiments, the computing device may send, to the client device, a notification regarding the target service time once the computing device determines the target service time for the client device. The computing device may re-send, to the client device, a notification regarding the target service time when the computing device re-calculate the target service time and the new target service time is considerably different from the previously notified target service time. As an example and not by way of limitation, continuing with the prior example, the service gateway may send a notification to Jane's smartphone such as, for example, "Your approximate waiting time is 10 minutes." Although this disclosure describes sending a notification regarding the target service time in a particular manner, this disclosure contemplates sending a notification regarding the target service time in any suitable manner.

In particular embodiments, the computing device may send collected service information and collected customer information to a second computing device in the merchant computing system through a merchant-facing interface. In particular embodiments, the second computing device in the merchant computing system may comprise a computer, a workstation, a server, a handheld device, or any machine with computing capacity used within the merchant organization. In particular embodiments, the merchant-facing interface may collocate with the service gateway. As an example and not by way of limitation, continuing with the prior example, handheld devices may be used by personnel working at the returns desk at the furniture store. The service gateway may send the collected service information and the collected customer information to the handheld devices. As another example and not by way of limitation, a big data analysis server may be a part of merchant computing system. The service gateway may send the collected service information and the collected customer information to the server. Although this disclosure describes providing collected information to a second computing device in the merchant computing system through the merchant-facing interface in a particular manner, this disclosure contemplates providing collected information to a second computing device in the merchant computing system through the merchant-facing interface in any suitable manner.

In particular embodiments, the collected service information may comprise, but not limited to, the identification information for the service, and the additional service information acquired during the registration procedure. The additional service information may include, by way of example and not limitation, a barcode information of a product to be serviced, a serial number of a product to be serviced, a photo of a product to be serviced, detailed descriptions of the service, or any combination thereof. As an example and not by way of limitation, continuing with the prior example, the service gateway may provide an indication that Jane wants to return a lamp and the photo of the lamp to a handheld device associated with an employee working at the returns desk. The service gateway may also provide barcode information that was recognized by the service gateway. Although this disclosure describes providing collected service information to a computing device in the merchant computing system through the merchant-facing interface in a particular manner, this disclosure contemplates providing collected service information to a computing device in the merchant computing system through the merchant-facing interface in any suitable manner.

In particular embodiments, the collected customer information may comprise, but not limited to, the identification information for the customer, the additional customer information acquired during the receiving registration information, the customer information from the customer reports during the obtaining customer information, or any combination thereof. The additional customer information acquired during the receiving registration information may comprise, but not limited to, membership status, membership identifier, name, age, gender, race, income level, address, online social-network identification information, telephone number of the customer, or any combination thereof. The customer reports comprise, but not limited to, habits of the customer, recent trend of the customer, trend of the activities of the customer in online social-networks, estimated current interest of the customer, trend of the users who are associated with the customer in online social networks, trend of the customers who share a particular commonality with the customer, or any combination thereof. As an example and not by way of limitation, continuing with the prior example, the service gateway may provide a merchant server in the merchant computing system through the merchant-facing interface that Jane is interested in purchasing a new sofa based on her search activities in an online social network. As another example and not by way of limitation, the service gateway may provide a merchant server in the merchant computing system through the merchant-facing interface that female at Jane's age is interested in remodeling their houses. Although this disclosure describes providing collected customer information to a merchant computing device through the merchant-facing interface in a particular manner, this disclosure contemplates providing collected customer information to a merchant computing device through the merchant-facing interface in any suitable manner.

In particular embodiments, the computing device may receive instructions, from a second computing device in the merchant computing system, through the merchant-facing interface, to send a notification regarding events at nearby locations to the customer. On receiving the instructions from the merchant-facing interface, the computing device may send, to the client device, the notification regarding events at nearby locations. In particular embodiments, the computing device may select a subset of events at nearby locations for the customer based on the customer information available at the computing device. In particular embodiments, a notification regarding events at nearby locations comprises discount offers. In particular embodiments, a notification regarding events at nearby locations comprises promotional offers. In particular embodiments, a notification regarding events at nearby locations comprises advertisements. As an example and not by way of limitation, continuing with the prior example, the service gateway may receive instructions from a server located at the furniture store datacenter to send a notification regarding events at nearby locations to Jane. On receiving the instructions, the service gateway may send a notification regarding a discount event in the furniture section such as, for example, "We are offering 20% off on selected items in the furniture section. Why not take a look at them? We'll move you to the front of the line when you return." Although this disclosure describes providing a notification regarding events for a customer in a particular manner, this disclosure contemplates providing a notification regarding events for a customer in any suitable manner.

In particular embodiments, the computing device may provide an expected number of arrivals per service type over next pre-determined time frame to a second computing device in the merchant computing system via the merchant-facing interface. The expected number of arrivals per service type may be used for dynamic allocation of a number of service personnel. The computing device may provide service information to the second computing device in the merchant computing system when a new service request is received. The service information may comprise expected waiting time for the service. The computing device may be able to calculate an expected number of arrivals of a service type in the next pre-determined period. The computing device may provide the expected number of arrivals to the second computing device in the merchant computing system through the merchant-facing interface. In particular embodiments, the second computing device in the merchant computing system may calculate the expected number of arrivals based on expected waiting time for each requested service. As an example and not by way of limitation, continuing with the prior example, the service gateway may provide a handheld device for an employee working at the return service desk the expected number of merchandise return customers in the next 10 minutes when the service gateway provides the information regarding the lamp return from Jane along with the photo of the lamp to the handheld device. The service gateway may provide an indication that Jane is interested in purchasing a sofa to a server in the merchant computing system. Based on the expected number of merchandise return customers in the next 10 minutes, the merchant may be able to dynamically allocate the number of personnel at the returns desk. Although this disclosure describes providing an expected number of arrivals to the merchant-facing interface in a particular manner, this disclosure contemplates providing an expected number of arrivals to the merchant-facing interface in any suitable manner.

In particular embodiments, the computing device may provide an alert to a second computing device in the merchant computing system through the merchant-facing interface if the expected number of arrivals for a specific service type over next pre-determined time frame exceeds a pre-determined threshold. The alert may indicate that the number of service personnel may need to be increased. As an example and not by way of limitation, continuing with the prior example, the service gateway may determine that the number of merchandise return customers in the next 10 minutes exceeds the pre-determined threshold. Then, the service gateway may send an alert to the handheld device associated with a manager supervision the return service desk. On receiving the alert, the manager may increase the number of personnel at the returns desk immediately. Although this disclosure describes providing an alert to a computing device in the merchant computing system through the merchant-facing interface for a particular reason in a particular manner, this disclosure contemplates providing an alert to a computing device in the merchant computing system through the merchant-facing interface for any suitable reason in any suitable manner.

In particular embodiments, the computing device may adjust the position of a client device in the waiting queue based on the obtained customer information during the obtaining customer information. The computing device may adjust the position of the client device based on the estimated arrival times of the client devices to the service location as we have already discussed above. The computing device may also adjust the position of the client device 110 based on the obtained customer information. As an example and not by way of limitation, the service gateway may learn that customers who return less than $100 worth of merchandise often purchase more than $100 worth of merchandise if they are serviced at the returns desk in less than five minutes during the obtaining customer information process. When Jane registers with the service gateway for the lamp return, the service gateway may adjust the position of Jane in the waiting queue to make sure that Jane may complete her return in less than five minutes as long as the other conditions allow this adjustment. Although this disclosure describes adjusting the position of a client device in the waiting queue for a particular reason in a particular manner, this disclosure contemplates adjusting the position of a client device in the waiting queue for any suitable reason in any suitable manner.

In particular embodiments, the computing device may adjust the position of a client device in the waiting queue based on previous notification sent to the client device. The computing device may have sent one or more notifications regarding events at nearby locations to the client device. The notifications may have been accompanied with a promise to move the client device 110 to the front of the waiting queue when the client device 110 comes back to the service location. If the client device has been away from the service location for a while after receiving the notification, the computing device may put the client device 110 at the front of the waiting queue when the client device 110 comes back. In particular embodiments, the computing device may adjust the position of a client device 110 in the waiting queue based on the user's previous activities. After receiving a notification regarding events at nearby locations, the user may have been away from the service location to get involved with any of the nearby events, for example but not limited to, purchasing a discounted item, participating a promotional event, and looking around promotional items. The computing device may move the client device 110 to the front of the waiting queue when the client device 110 come back to the service location after getting involved in the events at nearby locations. As an example and not by way of limitation, continuing with the prior example, the service gateway may send a notification, "Your waiting approximate waiting time is 15 minutes. Today's special at the cafeteria is Swedish meatballs. Why not grab some Swedish meatballs at the cafeteria? We'll move you to the front of the line when you return" to Jane. Jane has moved to the cafeteria and had a light snack after receiving the notification. When Jane comes back to the returns desk, the service gateway move Jane to the front of the waiting queue because the service gateway has sent a notification with a promise to Jane and Jane has purchased items at the cafeteria after receiving the notification. Although this disclosure describes adjusting the position of a client device in the waiting queue for a particular reason in a particular manner, this disclosure contemplates adjusting the position of a client device in the waiting queue for any suitable reason in any suitable manner.

A method to coordinate the wait times among the customers at multiple merchants is disclosed here. This method is an extension of the merchant-facing queue interface. If multiple merchants are registered with the same system, they may coordinate the wait times among customers. The proposed method may work particularly well in locations where multiple merchants are located close together. For example, a furniture store may be located near a hardware store and a fast-food restaurant. The three merchants may share customer data with one another (in accordance with all privacy protocols) and may suggest different actions a user may take. Shared data may comprise, but not limited to, approximate wait times, user location, the items the user wishes to purchase, calendar events, items in a to-do list, or other suitable information. As an example and not by way of limitation, a customer may register on the customer-facing system, and may also input that he is returning a bed frame because it did not fit in his new bedroom. The furniture store may share this information with the hardware store, which may infer that the customer has recently moved into a new home. The hardware store may send the customer a recommendation in the form of a message that says, "Instead of sitting at the furniture store while you wait, come over to the hardware store for some gardening tools. Don't worry, we'll hold your place in line." Thus, the customer may go to the hardware store to purchase some items while he "waits" to return his items at the furniture store. In particular embodiments, the merchants may share the customer-facing system. In particular embodiments, each merchant deploys its own customer-facing system. In this case, the merchants share the information among them using pre-determined communication channels and protocols. In any deployment scenario, the customer experience may be identical as if the customer is dealing with a single customer-facing system.

Likewise, the fast-food restaurant may learn that the customer has an approximate wait time of 20 minutes at the furniture store. The fast-food restaurant may send the customer a message that says, "Don't wait hungry. Come to our restaurant for a Cheesy Gordita Crunch. We'll make sure you don't lose your place in line." If the customer has items on a to-do list saved on his smartphone, and the customer has enabled sharing on the to-do list, the merchants may use this information to send messages to the customer to help the customer complete his to-do list items as efficiently as possible. It is also contemplated that the customer may place orders for items at the hardware store, the fast-food restaurant, or any other store on his smartphone while he is still inside the furniture store. In particular embodiments, the recommendation may be further based on information regarding traffic, mass transit services, other events taking place within or nearby the geographic area, time-of-day information, or date information.

In particular embodiments, the recommendation may provide functionality to register for a service at one of the other service locations within the geographic area. In particular embodiments, the other service location may provide a similar service to the requested service, and the other service location may have a shorter estimated service time than the service location of the requested service. For example, both service locations may be associated with the same merchant (e.g., both are In 'N' Out hamburger restaurants), where one is packed and the other has much shorter lines. In another example, the two service locations may be associated with different merchants (e.g., In 'N' Out vs. Fatburger). In particular embodiments, the other service location provides a service complementary to the requested service, and wherein the other service location has an estimated service time complementary to the estimated service time of the service location of the requested service.

Figure 6:
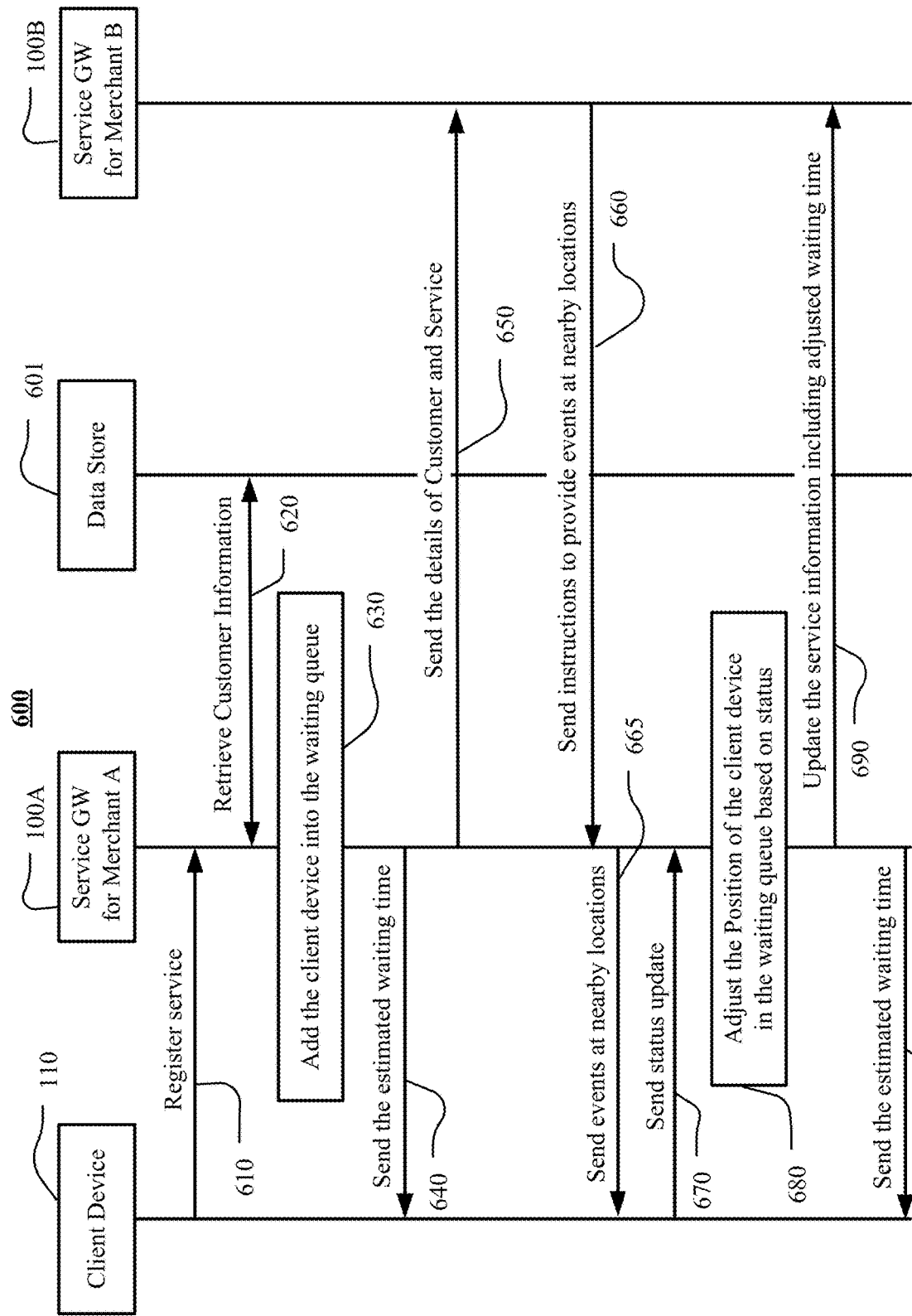
FIG. 6 illustrates an example interaction flow for implementing wait-time coordination among customers at multiple merchants.

FIG. 6 illustrates an example interaction flow 600 for implementing wait-time coordination among customers at multiple merchants: merchant A and merchant B. Though this example shows only two merchants, wait-time coordination may work with any number of merchants. At step 610, the service gateway 100A for merchant A may receive a service registration from a client device 110. At step 620, the service gateway 100A may retrieve customer information from one or more accessible data stores 601. In particular embodiments, the data store 601 may be a shared data store among multiple merchants participating in the wait-time coordination. At step 630, the service gateway 100A may add the client device 110 into a waiting queue 250 and may calculate an estimated waiting time for the service. At step 640, the service gateway may send a notification regarding the estimated waiting time to the client device 110. At step 650, the service gateway 100A may send the details of the customer and the service to the service gateway 100B for merchant B. In particular embodiments, the service gateway 100A may send the information directly to the service gateway 100B. In particular embodiments, the service gateway 100A may send the information to the service gateway 100B through a node among the shared nodes, for example, through a shared data store 601. At step 660, the service gateway 100A may receive instructions to provide a notification regarding events at nearby locations from the service gateway 100B. At step 665, the service gateway 100A may send a notification regarding the events at nearby locations to the client device 110. In particular embodiments, the service gateway 100B may send the notification regarding the events at nearby locations directly to the client device 110. At step 670, the service gateway 100A may receive status update from the client device 110. At step 680, the service gateway 100A may adjust the position of the client device in the waiting queue based on received status information of the client device 110 and status information of the other client devices in the waiting queue. The service gateway 100A may re-calculate the estimated waiting time of the client device and the other client devices impacted by the status update at step 670. At step 690, the service gateway 100A may send updated service information including re-calculated waiting time of the client device at the service location to the service gateway 100B. At step 691, the service gateway 100A may send a notification regarding the updated waiting time to the client device 110. The steps 670 and beyond may occur repeatedly. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for coordinating wait times among the customers at multiple merchants including the particular steps of the method of FIG. 6, this disclosure contemplates any suitable method for coordinating wait times among the customers at multiple merchants including any suitable steps, which may include all, some, or none of the steps of the method of FIG. 6, where appropriate. In this example, the estimated waiting time may be replaced with the target service time. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
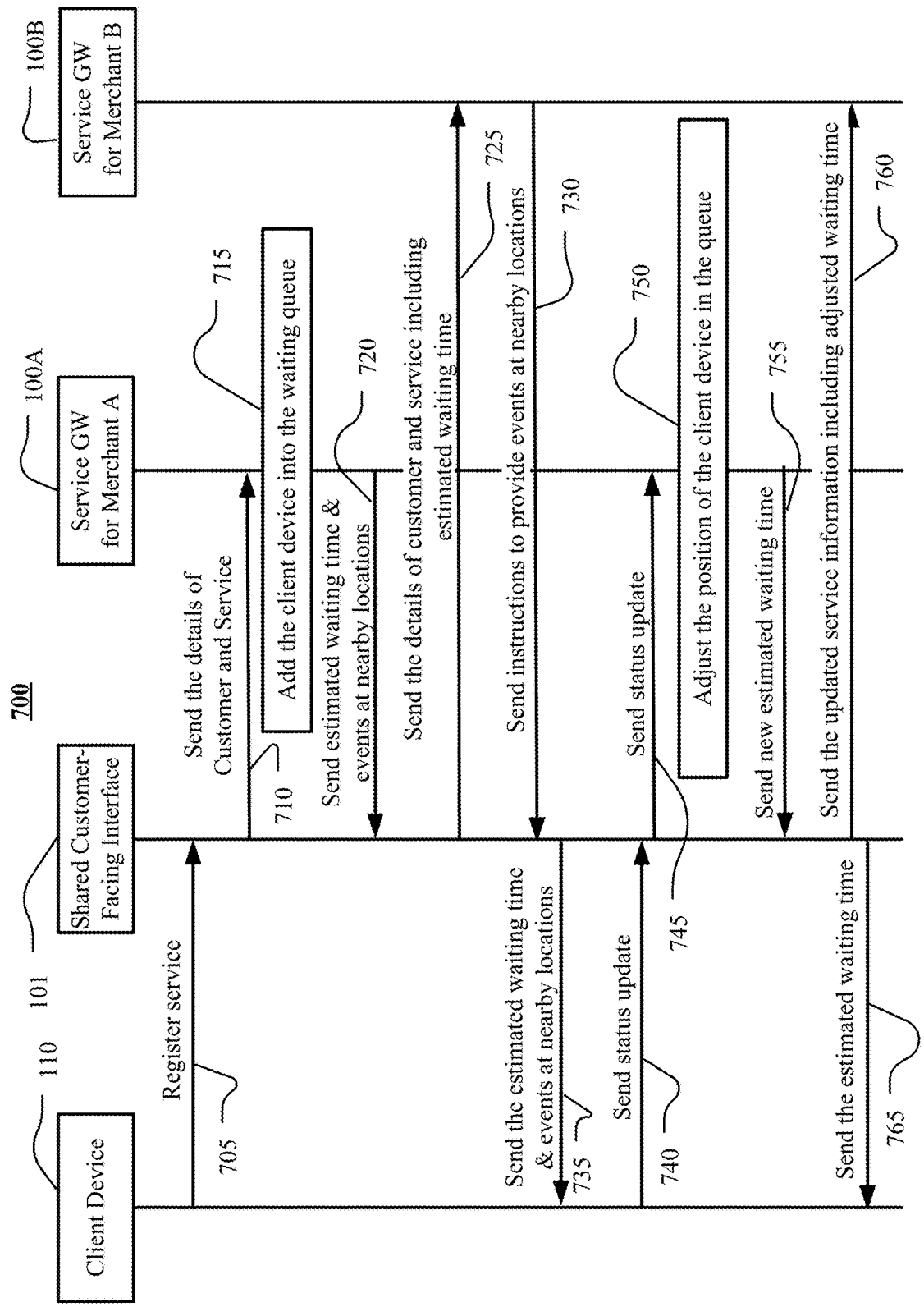
FIG. 7 illustrates another example interaction flow for implementing wait-time coordination among customers at multiple merchants.

FIG. 7 illustrates another example interaction flow 700 for implementing wait-time coordination among customers at multiple merchants; merchant A and merchant B. A shared customer-facing interface 101 is deployed in the multi-merchant queue management system in this example, where the shared customer-facing interface may relay communications between client devices and merchant service gateways. The shared customer-facing interface may also relay communications between merchant service gateways. At step 705, the shared customer-facing interface 101 may receive a service registration from a client device 110. At this step, the shared customer-facing interface may exchange multiple messages with the client device 110 to acquire detailed customer information and/or service information from the client device 110. In this example, the service registration received at step 705 was for a service at merchant A. At step 710, the shared customer-facing interface 101 may send the detailed customer information and service information acquired at step 705 to the service gateway 100A for merchant A. In particular embodiments, the share customer-facing interface 101 may send further customer information after retrieving customer information from a data store 601. In particular embodiments, the service gateways 100A and 100B may retrieve further customer information from a data store 601 respectively. The data store 601 is not shown in FIG. 7. In particular embodiments, the data store 601 may be a shared data store among the merchants participating in the wait-time coordination. At step 715, the service gateway 100A for merchant A may add the client device into the waiting queue for the registered service. The service gateway 100A may calculate an target service time for the registered service. The service gateway 100A may also determine events at nearby locations that the customer may be interested in. At step 720, the service gateway 100A may send the shared customer-facing interface 101 instructions to provide a notification regarding an estimated waiting time for the service and the events at nearby locations to the client device 110. At step 725, the shared customer-facing interface 101 may send the detailed customer information and service information acquired at step 705 as well as the estimated waiting time for the service that was acquired at step 720 to the service gateway 100B for merchant B. The service gateway 100B may determine events at nearby locations that the customer may be interested in. At step 730, the service gateway 100B may send the shared customer-facing interface 101 instructions to provide a notification regarding the events at nearby locations. At step 735, the shared customer-facing interface 101 may send notifications to the client device 110. The notification may include the estimated waiting time for the service and events at nearby locations. The information from the service gateways 100A and 100B may be combined into a single notification, or sent separately in multiple notifications. At step 740, the shared customer-facing interface 101 may receive status update from the client device 110. At step 745, the shared customer-facing interface 101 may send the received status update to the service gateway 100A. On receiving the status update, the service gateway 100A, at step 750, may adjust the position of the client 110 in the waiting queue and re-calculate the target service time. At step 755, the service gateway 100A may send a new estimated waiting time based on re-calculated target service time to the shared customer-facing interface 101. The service gateway 100A may also send updated events at nearby locations at step 755. At step 760, the shared customer-facing interface 101 may send the service gateway 100B updated service information including the new waiting time for the service. On receiving the updated service information, the service gateway 100B may determine new events at nearby locations for the customer and may send the updated events at nearby locations to the shared customer-facing interface 101 though this message is not shown in FIG. 7. At step 765, the shared customer-facing interface may send notifications regarding the updated estimated waiting time. The shared customer-facing interface 101 may also send notifications regarding updated events at nearby locations if the shared customer-facing interface 101 have received any updated events at nearby locations from either service gateways 100A or 100B. The steps 740 and beyond may occur repeatedly. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for coordinating wait times among the customers at multiple merchants including the particular steps of the method of FIG. 7, this disclosure contemplates any suitable method for coordinating wait times among the customers at multiple merchants including any suitable steps, which may include all, some, or none of the steps of the method of FIG. 7, where appropriate. In this example, the estimated waiting time may be replaced with the target service time. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In particular embodiments, a computing device may receive, from a client device, registration information for a service to be provided to a customer, the customer being associated with the client device. When a customer wants to get a service, the customer may register with a customer-facing interface that belongs to the service providing entity for the desired service. In particular embodiments, the customer-facing interface may belong to a third party service provider that has agreements with multiple merchants. The customer may use an application installed on her own mobile device such as, for example, a smartphone or tablet computer for the registration. The address of the customer-facing system and the used protocols may be configured on the application, thus the customer may not need to know such details for registration. As an example and not by way of limitation, Alice, a customer, may want to return a bedframe she bought from a furniture store. Alice may register for the return using an application on her smartphone as she enters into the furniture store. In particular embodiments, the used application may have been released by the furniture store. In particular embodiments, the used application may have been provided by a service provider that has agreements with multiple merchants. The address of the service gateway and protocols may be pre-configured on the application. In particular embodiments, the application may have been released by a social-networking service provider. The social-networking service provider may have established an agreement with the furniture store to handle such a registration on behalf of the furniture store. Although this disclosure describes receiving registration information in a particular manner, this disclosure contemplates receiving registration information in any suitable manner.

In particular embodiments, the computing device may perform the following steps to receive registration information: The computing device may receive, from the client device, a registration request, wherein the registration request includes identification information for the client device, identification information for the service, and identification information for the customer. The computing device may send an instruction to enable location and/or status reporting to the client device. In particular embodiments, in response to receiving the registration request, the computing device may send, to the client device, a request for additional information. In particular embodiments, the computing device may receive, from the client device, the additional information. As an example and not by way of limitation, continuing with the prior example, Alice may provide input on the application on her smartphone that she wants to return a bedframe. The application may send a registration request to a service gateway belonging to the furniture store comprising the service information (e.g., returning a bedframe), customer information that is Alice's profile stored in the application, and the client device information (e.g., phone number, IP address of the smartphone, or unique identifier assigned to the application). In particular embodiments, the application may send a registration request to a shared customer-facing interface. The shared customer-facing interface may be operated by a third party service provider that has agreements with multiple merchants. On receiving the registration request, the service gateway may send an instruction to enable location and/or status reporting to Alice's smartphone. The service gateway may also send a request for additional information such as, for example, a photo of the bedframe that is to be returned to Alice's smartphone. Alice may be alerted about the photo request from her smartphone. Thus, Alice may take a photo of the bedframe on her smartphone and may send the photo to the service gateway. In particular embodiments, the service gateway may recognize the model number of the bedframe from the photo or recognize the barcode of the bedframe from the photo. Although this disclosure describes receiving registration information in a particular manner, this disclosure contemplates receiving registration information in any suitable manner.

In particular embodiments, the computing device may send a request for additional client device information. The additional client device information for a client device may comprise, but not limited to, identification information for client device hardware model, client device hardware version, identification information for operating system running on the client device, version information of operating system running on the client device, identification information for the application, running on the client device, communicating with the computing device, version information of the application, identification information of available communication interfaces on the client device, preferred communication mode of the client device, or any combination thereof. As an example and not by way of limitation, continuing with the prior example, the service gateway may send a request to Alice's smartphone for the version of the application Alice is using and a request for the preferred method of location reporting. Those additional device information is used for establishing communication channel for further communications. Although this disclosure describes receiving particular client device information in a particular manner, this disclosure contemplates receiving any suitable client device information in any suitable manner.

In particular embodiments, the computing device may send a request for additional service information. The additional service information may be dependent of the requested service. The additional service information may comprise, but not limited to, a barcode information of a product to be serviced, a serial number of a product to be serviced, a photo of a product to be serviced, detailed descriptions of the service, or any combination thereof. As an example and not by way of limitation, continuing with the prior example, the service gateway may send a request to Alice's smartphone for a photo of the bedframe that is to be returned. Alice may be alerted about the photo request from her smartphone. Thus, Alice may take a photo of the bedframe on her smartphone and may send the photo to the service gateway. In particular embodiments, the service gateway may recognize the model number of the bedframe from the photo or recognize the barcode of the bedframe from the photo. Although this disclosure describes receiving particular service information in a particular manner, this disclosure contemplates receiving any suitable service information in any suitable manner.

In particular embodiments, the computing device may send a request for additional customer information. The additional customer information may comprise, but not limited to, membership status, membership identifier, name, age, gender, race, income level, address, online social-network identification information, telephone number of the customer, or any combination thereof. As an example and not by way of limitation, continuing with the prior example, the service gateway may send a request to Alice's smartphone for gender, age, and identifier on an online social network (e.g., Facebook). The service gateway may use such information to collect further information about Alice to estimate Alice's current interest with better accuracy. Although this disclosure describes receiving particular customer information in a particular manner, this disclosure contemplates receiving any suitable customer information in any suitable manner.

In particular embodiments, the computing device may send a request for planned-activities data. In particular embodiments, the client device may autonomously send the planned-activities data to the computing device without receiving the request from the computing device. In particular embodiments, the planned-activities data may comprise one or more records of planned activities of the customer, the planned-activities data being collected by the application of the client device from sources comprising, but not limited to, calendar, emails, text messages, To-Do list, or any other suitable source. In particular embodiments, the client device may send raw data of the information sources to the computing device. The computing device may compile a list of planned activities of the customer from the received raw data. As an example and not by way of limitation, continuing with the prior example, Alice may have a to-do list on her smartphone including buying a gardening tool and a list of groceries. The service gateway may send a request for planned-activities data to Alice's smartphone. The application on the Alice's smartphone may access the to-do list and may send the list to the service gateway. The service gateway may provide a suggestion to Alice's smartphone if any of the tasks can be completed at the merchant the service gateway belongs to. The service gateway may forward such information to the other service gateways belonging to the other merchants participating to the community. Although this disclosure describes receiving planned-activities data in a particular manner, this disclosure contemplates receiving planned-activities data in any suitable manner.

In particular embodiments, the computing device may retrieve stored customer records associated with the customer using customer information within the registration information. In particular embodiments, the customer records may be stored locally on the computing device or on the remotely accessible data store. In particular embodiments, the remotely accessible data store is a server in a social-networking system. In particular embodiments, the remotely accessible data store is a shared data store among the merchants participating to the community. The computing device may acquire a first customer report associated with the customer by analyzing the stored customer records using one or more pre-determined analysis algorithms. In particular embodiments, the one or more pre-determined analysis algorithms may comprise a big data analysis algorithm. In particular embodiments, the customer records associated with the customer may comprise, but not limited to, purchasing history associated with the customer, service history associated with the customer, activities of the customer in online social-networks, activities of the users who are associated with the first customer within online social-networks, records of the customers who share a particular commonality with the customer, or any combination thereof.

The first customer report may comprise behavior patterns, preferences and other useful business information associated with the customer. In particular embodiments, the computing device may generate the first customer report comprising, but not limited to, habits of the customer, recent trend of the customer, trend of the activities of the customer in online social networks, estimated current interest of the customer, trend of the users who are associated with the customer in online social-networks, trend of the customers who share a particular commonality with the customer, or any combination thereof.

In particular embodiments, a first computing device may send, to a second computing device, the registration information, a target service time, and the first customer report. The registration information may comprise planned-activities data received from the client device during the registration. In particular embodiments, the first computing device may be a service gateway associated with a first merchant, and the second computing device may be another service gateway associated with a second merchant. The customer may be supposed to be serviced in the first merchant. In particular embodiments, the first service gateway may send the registration information, the target service time, and the first customer report directly to the second service gateway. In particular embodiments, the first service gateway may send the registration information and the first customer report through other computing devices, for example but not limited to, a shared customer-facing interface. The first computing device may receive, from the second computing device, a second customer report associated with the customer and instructions to send a notification regarding events at nearby locations to the customer to the customer.

In particular embodiments, the first computing device may send, to a server in the merchant computing system through a merchant-facing interface, the registration information, the target service time, the first customer report, and the second customer report. The first computing device may receive instructions, from the server in the merchant computing system via the merchant-facing interface, to send a notification regarding events at nearby locations to the customer as described in the merchant-facing queue interface section. The registration information may comprise planned-activities data received from the client device during the registration. The events at nearby locations may be associated with the planned-activities data.

In particular embodiments, the first computing device may send, to the client device, a notification regarding events at nearby locations. In particular embodiments, the first computing device may send one notification combining the events at nearby locations received from a server in the merchant computing system via the merchant-facing interface and events at nearby locations received from the second computing device associated with the second merchant. In particular embodiments, the first computing device may send separate notification for each received events at nearby locations. In particular embodiments, a notification regarding events at nearby locations comprises discount offers. In particular embodiments, a notification regarding events at nearby locations comprises promotional offers. In particular embodiments, a notification regarding events at nearby locations comprises advertisements. As an example and not by way of limitation, continuing with the prior example, the service gateway belonging to the furniture store may receive instructions from a server located at the furniture store datacenter to send a notification regarding a discount event to Alice. On receiving the instructions, the service gateway may send a notification regarding a discount event in the furniture section such as, for example, "We are offering 20% off on selected items in the furniture section. Why not take a look at the them? We'll move you to the front of the line when you return." The service gateway belonging to the furniture store may receive instructions from a service gateway belonging to a hardware store to send a notification regarding an advertisement. The service gateway may send a notification regarding the personalized advertisement such as, for example, "Instead of sitting at the furniture store while you wait, come over to the hardware store for some gardening tools. Don't worry, we'll hold your place in line." The service gateway may send a single notification for the multiple events from multiple merchants, or send separate notification for events from each merchant. Although this disclosure describes providing a notification regarding events from multiple merchants for a customer in a particular manner, this disclosure contemplates providing a notification regarding events from multiple merchants for a customer in any suitable manner.

In particular embodiments, a first computing device may receive, from a second computing device, a registration information for a service, a target service time, and a customer report associated with a customer, where the service to be provided to the customer, and the customer is associated with a client device. The first computing device may be a service gateway associated with a first merchant and the second computing device may be a service gateway associated with a second merchant. The service may be provided by the second merchant to the customer. On receiving the registration information, the target service time, and the customer report, the first computing device may add the second client device into an active client devices list. The active client devices list may comprise a list of information regarding the client devices that are waiting to be serviced by the other merchants. The information may include registration information, the target service time, and available customer reports. The first computing device may obtain a second customer report associated the customer by retrieving stored customer records associated with the customer using customer information within the registration information and analyzing the retrieved stored customer records using one or more pre-determined analysis algorithms. The first computing device may also send, to a server in the merchant computing system via the corresponding merchant-facing interface, the registration information and the customer report received from the second computing device and the second customer report. The first computing device may receive instructions, as a response, from the server in the merchant computing system through the merchant-facing interface, to send a notification regarding events at nearby locations to the client device. The first computing device may respond to the second computing device with the second customer report and the events at nearby locations received from the server in the merchant computing system. The communications between the first computing device and the second computing device may be delivered directly or through a third computing device, for example but not limited to, a customer-facing interface. As an example and not by way of limitation, continuing with the prior example, the service gateway belonging to the furniture store may receive, from the service gateway belonging to a hardware store, registration information indicating that Tom, a customer, is renting a truck, a target service time of 30 minutes, and a customer report indicating that Tom has lived in another state until recent. The available information may indicate that Tom has moved recently or is moving soon. The service gateway may generate another customer report by retrieving records from the data store and analyzing the retrieved records. The new customer report may indicate that Tom has shown interest in purchasing a new bedframe. The service gateway may send the received registration information, the target service time, the received customer report, and the generated customer report to a server at the furniture store via the merchant-facing interface. The service gateway may receive, from the furniture store server via the merchant-facing interface, instructions to send a notification to Tom such as, for example, "We are offering 30% off on selected items in the bedroom section. Offer ends soon. We'll move you to the front of the line when you return." The service gateway belonging to the furniture store may send, to the service gateway belonging to the hardware store, the generated customer report and the instructions received from the merchant-facing interface. Although this disclosure describes sharing particular information among merchants in a particular manner, this disclosure contemplates sharing any suitable information among merchants in any suitable manner.

In particular embodiments, a first computing device may receive, from a client device in the waiting queue, status information. The first computing device may be a service gateway belonging to a first merchant. The first computing device may adjust the position of the client device in the waiting queue as discussed above. The first computing device may re-calculate the target service time of the client device as discussed above. The first computing device may send, to a second computing device belonging to a second merchant, status update for the client device that comprises the re-calculated target service time. The first computing device may receive, from the second computing device, instructions to send a notification regarding updated events at nearby locations. The first computing device may send, to the client device, a notification regarding the re-calculated target service time and the updated events at nearby locations. The communications between the first computing device and the second computing device may be delivered directly or through a third computing device, for example but not limited to, a customer-facing interface.

In particular embodiments, a first computing device belonging to a first merchant may receive, from a second computing device belonging to another merchant, status update for a client device comprising an updated target service time for the client device. Then, the first computing device may update the client device information in the active client devices list. If the updated target service time is considerable different from the previous target service time, the first computing device may send, to a server in the first merchant computing system via the merchant-facing interface, the service details including the updated expected waiting time for the client device and customer information including customer reports stored in the active client devices list. The first computing device may receive instructions, from the server in the first merchant computing system via the merchant-facing interface, to send a notification regarding events at nearby locations to the customer, wherein the events are different from the events previously provided to the client device. The first computing device may send, in response to the status update, to the second computing device, the instructions received via the merchant-facing interface. The communications between the first computing device and the second computing device may be delivered directly or through a third computing device, for example but not limited to, a customer-facing interface.

A method of a queue controller to manage a list of tasks of a user is disclosed here. The disclosed method is an extension of the multi-merchants community. The central controller, located locally or on a remote server, may manage a task list of a user. The central controller may access one or more locations of a user's smartphone, including, but not limited to, a calendar, to-do list, email, and text messages. The central controller may also access the wait times (e.g., line length, traffic) at the locations the user needs to visit. The central controller may analyze all the information and plan out a task list for the user based on what the user needs to accomplish and the relative wait times at various locations. The central controller may assign weights to particular tasks based on the task's importance and time-sensitivity. As an example and not by way of limitation, Alice, a user, may need to perform the following tasks on a Saturday: (1) pick up the dry-cleaning; (2) take her son to his soccer game at 11:30 am; (3) go to a doctor's appointment at 4:00 pm; (4) go to a super market to buy food for a party on Monday; and (5) go to the Department of Motor Vehicle (DMV). Some of these items are scheduled and some are unscheduled. These items may also have varying priorities, and some of the items may be accomplished on a different day. For example, taking her son to his soccer game may be a high-priority scheduled item for Alice. Thus, the central controller may assign a high weight to this task. On the other hand, picking up the dry-cleaning may be done at any time on Saturday while the dry cleaners are open, or may even be accomplished the following day. Thus, this task may receive a lower priority. The central controller may learn the user's habits based on several days' worth of task management. For example, if the central controller moves dry-cleaning to Sunday but the user still picks up the dry-cleaning on Saturday because she has to have her clothes for church on Sunday, the central controller may learn this and assign a higher weight to this particular task. Thus, using machine learning, the central controller may adjust the weights assigned to particular items.

The intelligent errand planner may account for errands that are eligible to be split up among several people. As an example and not by way of limitation, Alice and her son may be out running errands on a Saturday afternoon. The central controller may detect that Alice and her son are travelling together based on the GPS units in their smartphones. The central controller may notify Alice that she needs to go to the bank to obtain a cashier's check and may also notify Alice that her son may be able to run across the parking lot and pick up ice cream from the super market, which is an item on the user's grocery list.

Figure 8:
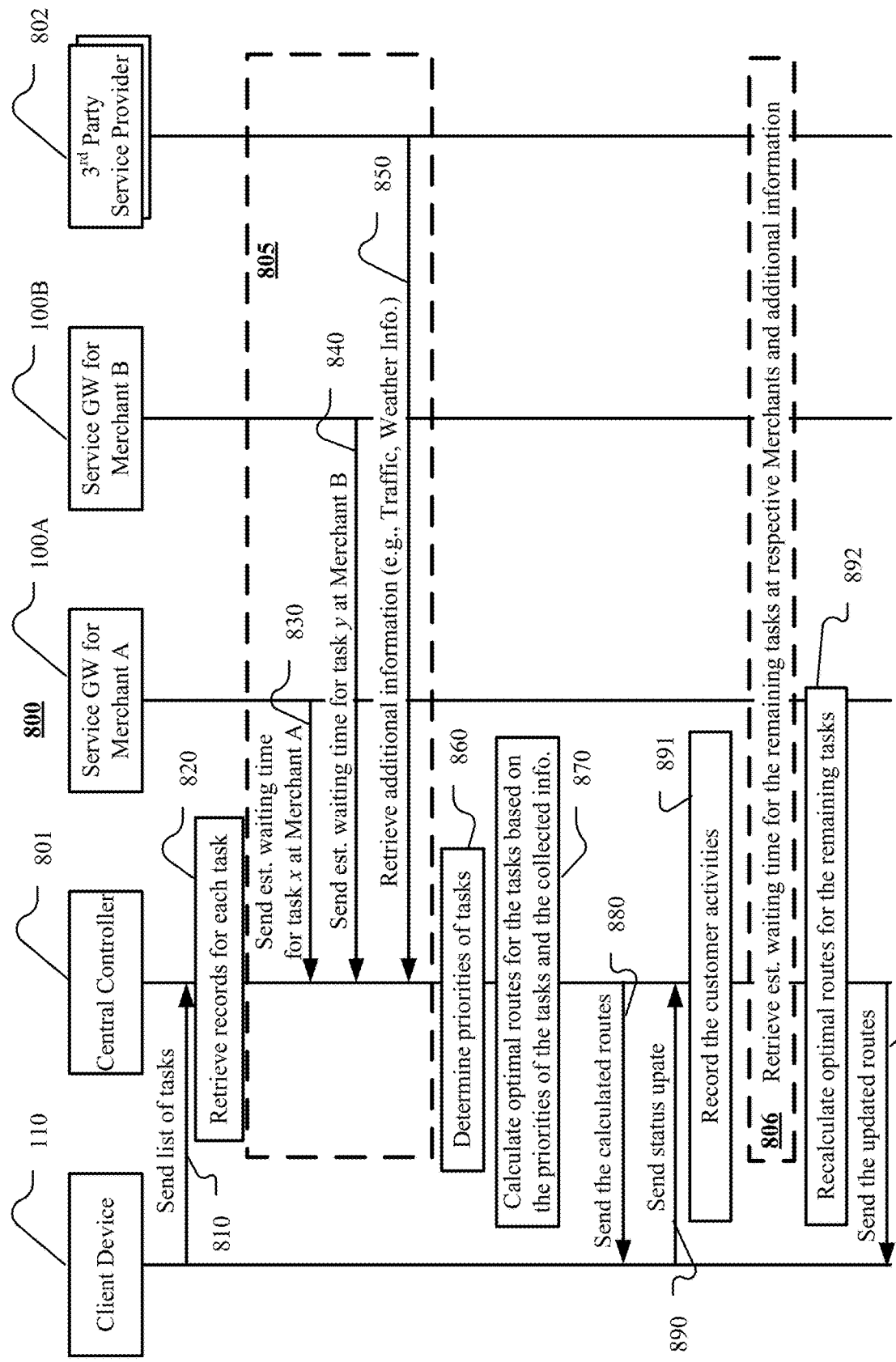
FIG. 8 illustrates an example interaction flow for implementing intelligent errand planning.

FIG. 8 illustrates an example interaction flow 800 for implementing intelligent errand planning. The method may begin at step 810, where a central controller 801 may receive a list of tasks from a client device 110. At step 820, the central controller 801 may retrieve, from the local storage or from any accessible data store, records for each task. The central controller 801 may collect (805) the time cost for each task on the list from the service gateways 100A, 100B for merchants and third-party service providers 802 at steps 830 through 850: service gateway 100A sends (830) waiting time for task x at Merchant A; service gateway 100B sends (840) waiting time for task y at Merchant B; and third-party service provider 802 sends (850) additional information. At step 860, the central controller 801 may determine the priorities of the tasks based on the retrieved records at step 820. At step 870, the central controller 801 may calculate optimal routes for the tasks based on the determined priorities of the tasks and the collected time cost for each task. At step 880, the central controller 801 may send, to the client device, a notification regarding the calculated routes. At step 890, the central controller 801 may receive, from the client device, status update comprising task completion, changed user's decision, addition of a task to the list, deletion of a task from the list, or any other suitable status update. At step 891, the central controller 801 may record the customer activities learned from the status update at step 890. Then, the central controller 801 may collect updated time cost for each remaining task in the list from the service gateways 100A, 100B and the third-party service providers 802. At step 892, the central controller 801 may re-calculate optimal routes for the remaining tasks in the list based on the status update from the client device 110 and re-collected time cost for each task acquired at 806. At step 893, the central controller 801 may send, to the client device 110, a notification regarding the re-calculated routes. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for implementing intelligent errand planner including the particular steps of the method of FIG. 8, this disclosure contemplates any suitable method for implementing intelligent errand planner including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

In particular embodiments, a computing device may receive, from a client device, the list of tasks to be completed for a user within a pre-determined period of time. The computing device may be a central controller 801 for implementing intelligent errand planner. In particular embodiments, the list of tasks may be generated by an application running on the client device based on contents of calendar, emails, text messages, to-do list, or any suitable source accessible from the client device. In particular embodiments, the list of tasks may be inputted by the first user.

In particular embodiments, the computing device may receive, from the client device, contents of calendar, emails, text messages, to-do list, or any suitable source accessible from the client device. Then, the computing device may generate a list of tasks by analyzing the received contents of calendar, emails, text messages, to-do list, or any suitable source from the client device. The application on the client device may not have enough computing power to analyze the contents from various sources and generate a list of tasks to be completed within a pre-determined period of time. In that case, the computing device may receive raw contents of each available source and generate a list of tasks by analyzing the received raw contents.

In particular embodiments, the computing device may retrieve stored user task records associated with the user, wherein the stored user task records comprise records of tasks previously performed by the user, wherein the stored user task records are accessible by the first computing device. The computing device may determine, for each task in the list, a preferred location, a priority among the tasks in the list, and any additional restrictions for the task by analyzing the retrieved user task records.

In particular embodiments, the computing device may determine, for each task in the list, whether a target computing device associated with the task is available to communicate with, wherein the target computing device may be a queue controller belonging to a merchant. In response to the determination, the computing device may send, to the target computing device, a request for a series of expected time for the task to be completed at a plurality of time instances. Then, the computing device may receive, from the target computing device, a response comprising a series of expected time for the task to be completed at a plurality of time instances. The computing device may be able to construct a table, based on the responses from target computing devices for the tasks in the list, representing expected time for each task to be completed at different time instances.

In particular embodiments, the computing device may send, for each directional task locations pair, to a traffic estimation server, a request for a series of expected travel time between locations at a plurality of time instances. Then, the computing device may receive, from the traffic estimation server, a response comprising a series of expected travel time at a plurality of time instances. The computing device may be able to construct a three-dimensional matrix, based on the responses from the traffic estimation server, representing expected travel time from a location for a task in the list to another location for another task in the list at different time instances.

In particular embodiments, the computing device may determine if weather affects the completion of any task in the list. In response to the determination, the computing device may send, to a weather forecast server, a request for a series of weather forecast at a plurality of time instances. The computing device may receive, from the weather forecast server, a response comprising a series of weather forecast at a plurality of time instances. The computing device may be able to construct a table, based on the response from the weather forecast server, representing expected weather at a plurality of time instances. Although this disclosure describes collecting weather information for planning tasks in a particular manner, this disclosure contemplates collecting any information for planning tasks in any suitable manner.

In particular embodiments, the computing device may determine, based at least on the priorities of the tasks in the list, the expected time for each task to be completed at different time instances, and the expected travel time from a location for a task to another location for another task at different time instances, a proposed schedule to perform the tasks. In particular embodiments, the computing device may also consider any identified additional restrictions for the tasks when the computing device determines the proposed schedule. Although this disclosure describes determining a proposed schedule in a particular manner, this disclosure contemplates determining a proposed schedule in a particular manner in any suitable manner.

In particular embodiments, the computing device may send, to the client device, the proposed schedule for performing the tasks. The computing device may, in response to the proposed schedule, from the client device, a confirmation message comprising an indication of acknowledgement from the user. On receiving the confirmation message, the computing device may set the schedule as the active schedule and may start monitoring the status of the tasks.

In particular embodiments, the computing device may receive, from the client device, a confirmation message comprising a counter proposal for the schedule for the tasks from the user. The computing device may re-calculate the amount of time required to complete the tasks based on the proposed schedule from the user and the collected time cost for task completion and for travels. The computing device may set the proposed schedule as the active schedule and may start monitoring the status of the tasks.

In particular embodiments, the computing device may determine, for each task in the list, whether a reservation is available and/or preferred. In response to the determination, the computing device may send, to a corresponding target computing device for the task, a reservation request for a time complying with the active schedule. The computing device may receive, from the corresponding target computing device, a response comprising a reservation confirmation.

In particular embodiments, the computing device may receive, from one of target computing devices corresponding to a task to be completed, an updated time cost estimation for the task at a plurality of time points. The computing device may re-determine an updated schedule for performing the remaining tasks based on the updated time cost estimation for the task. The computing device may send, to the client device, the updated schedule for performing the remaining tasks. The computing device may receive, from the client device, a confirmation message comprising an indication of acknowledgement from the user. The computing device may update the schedule for performing the remaining tasks based on the confirmation message.

In particular embodiments, the computing device may receive a confirmation message comprising a counter proposal on the schedule for the remaining tasks from the first user. The computing device may re-calculate the amount of time required to complete the tasks based on the user proposed schedule and the collected time cost for task completion and for travels. The computing device may set the proposed schedule as the active schedule and may resume monitoring the status of the tasks.

In particular embodiments, the computing device may receive, from the client device, an indication that a task is completed. The computing device may store a task record regarding the completed task to the designated data storage. The task record may be used in the future when the computing device plans for tasks for the user. The computing device may determine whether the current schedule needs to be updated. In response to the determination, the computing device may re-determine an updated schedule for performing the remaining tasks. The computing device may send, to the client device, the updated schedule for performing the remaining tasks. The computing device may receive, from the client device, a confirmation message comprising an indication of acknowledgement from the user. On receiving the confirmation message, the computing device may set the updated schedule as the active schedule and may continue monitoring the status of the tasks.

Figure 9:
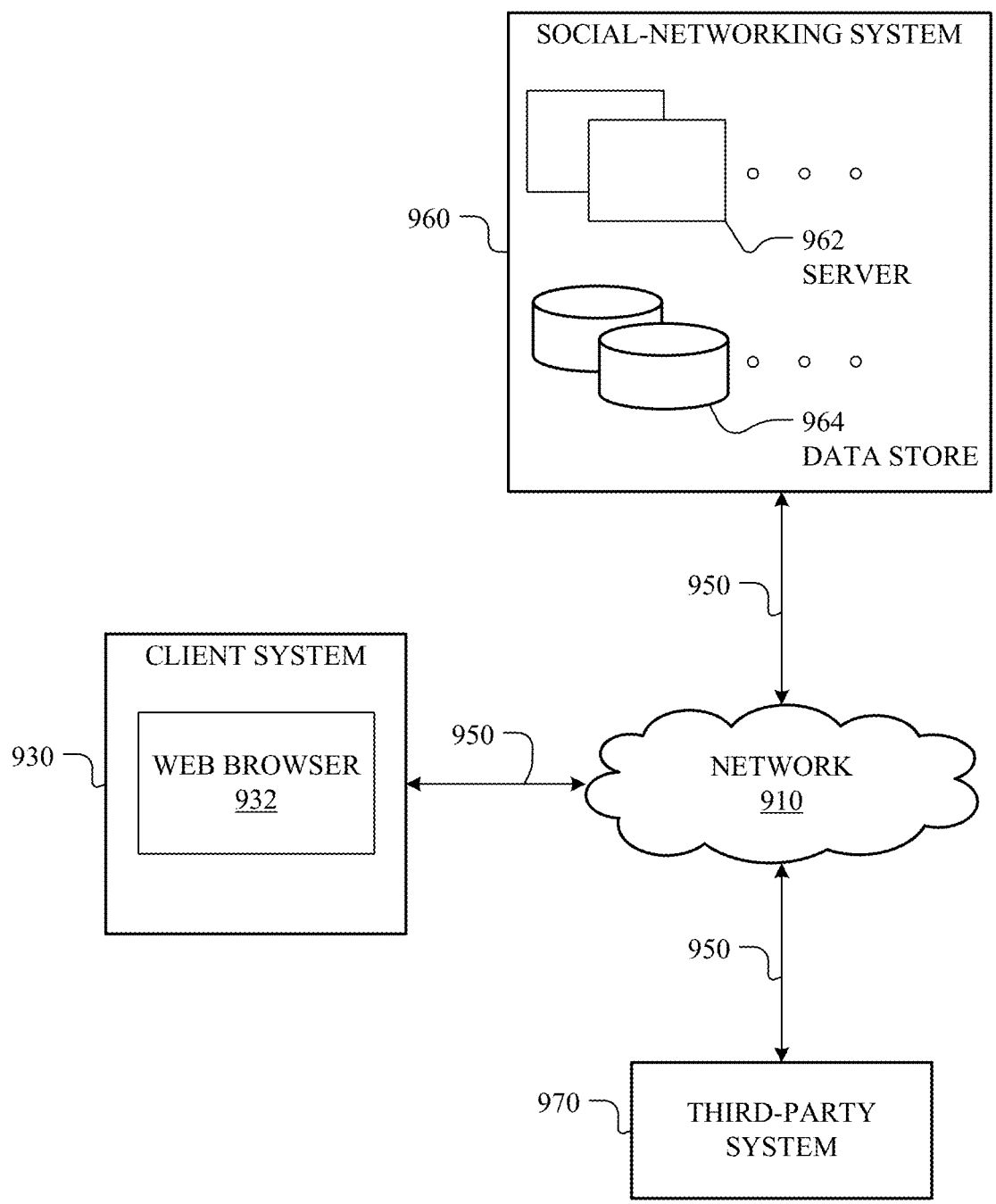
FIG. 9 illustrates an example network environment associated with a social-networking system.

FIG. 9 illustrates an example network environment 900 associated with a social-networking system. Network environment 900 includes a client system 930, a social-networking system 960, and a third-party system 970 connected to each other by a network 910. Although FIG. 9 illustrates a particular arrangement of client system 930, social-networking system 960, third-party system 970, and network 910, this disclosure contemplates any suitable arrangement of client system 930, social-networking system 960, third-party system 970, and network 910. As an example and not by way of limitation, two or more of client system 930, social-networking system 960, and third-party system 970 may be connected to each other directly, bypassing network 910. As another example, two or more of client system 930, social-networking system 960, and third-party system 970 may be physically or logically co-located with each other in whole or in part. Moreover, although FIG. 9 illustrates a particular number of client systems 930, social-networking systems 960, third-party systems 970, and networks 910, this disclosure contemplates any suitable number of client systems 930, social-networking systems 960, third-party systems 970, and networks 910. As an example and not by way of limitation, network environment 900 may include multiple client system 930, social-networking systems 960, third-party systems 970, and networks 910.

This disclosure contemplates any suitable network 910. As an example and not by way of limitation, one or more portions of network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 910 may include one or more networks 910.

Links 950 may connect client system 930, social-networking system 960, and third-party system 970 to communication network 910 or to each other. This disclosure contemplates any suitable links 950. In particular embodiments, one or more links 950 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout network environment 900. One or more first links 950 may differ in one or more respects from one or more second links 950.

In particular embodiments, client system 930 may be an electronic device including hardware, software, or embedded logic components or a combination of two or more such components and capable of carrying out the appropriate functionalities implemented or supported by client system 930. As an example and not by way of limitation, a client system 930 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 930. A client system 930 may enable a network user at client system 930 to access network 910. A client system 930 may enable its user to communicate with other users at other client systems 930.

In particular embodiments, client system 930 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 930 may enter a Uniform Resource Locator (URL) or other address directing the web browser 932 to a particular server (such as server 962, or a server associated with a third-party system 970), and the web browser 932 may generate a Hyper Text Transfer Protocol (HTTP) request and communicate the HTTP request to server. The server may accept the HTTP request and communicate to client system 930 one or more Hyper Text Markup Language (HTML) files responsive to the HTTP request. Client system 930 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 960 may be a network-addressable computing system that can host an online social network. Social-networking system 960 may generate, store, receive, and send social-networking data, such as, for example, user-profile data, concept-profile data, social-graph information, or other suitable data related to the online social network. Social-networking system 960 may be accessed by the other components of network environment 900 either directly or via network 910. As an example and not by way of limitation, client system 930 may access social-networking system 960 using a web browser 932, or a native application associated with social-networking system 960 (e.g., a mobile social-networking application, a messaging application, another suitable application, or any combination thereof) either directly or via network 910. In particular embodiments, social-networking system 960 may include one or more servers 962. Each server 962 may be a unitary server or a distributed server spanning multiple computers or multiple datacenters. Servers 962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 962 may include hardware, software, or embedded logic components or a combination of two or more such components for carrying out the appropriate functionalities implemented or supported by server 962. In particular embodiments, social-networking system 960 may include one or more data stores 964. Data stores 964 may be used to store various types of information. In particular embodiments, the information stored in data stores 964 may be organized according to specific data structures. In particular embodiments, each data store 964 may be a relational, columnar, correlation, or other suitable database. Although this disclosure describes or illustrates particular types of databases, this disclosure contemplates any suitable types of databases. Particular embodiments may provide interfaces that enable a client system 930, a social-networking system 960, or a third-party system 970 to manage, retrieve, modify, add, or delete, the information stored in data store 964.

In particular embodiments, social-networking system 960 may store one or more social graphs in one or more data stores 964. In particular embodiments, a social graph may include multiple nodes—which may include multiple user nodes (each corresponding to a particular user) or multiple concept nodes (each corresponding to a particular concept)—and multiple edges connecting the nodes. Social-networking system 960 may provide users of the online social network the ability to communicate and interact with other users. In particular embodiments, users may join the online social network via social-networking system 960 and then add connections (e.g., relationships) to a number of other users of social-networking system 960 to whom they want to be connected. Herein, the term "friend" may refer to any other user of social-networking system 960 with whom a user has formed a connection, association, or relationship via social-networking system 960.

In particular embodiments, social-networking system 960 may provide users with the ability to take actions on various types of items or objects, supported by social-networking system 960. As an example and not by way of limitation, the items and objects may include groups or social networks to which users of social-networking system 960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 960 or by an external system of third-party system 970, which is separate from social-networking system 960 and coupled to social-networking system 960 via a network 910.

In particular embodiments, social-networking system 960 may be capable of linking a variety of entities. As an example and not by way of limitation, social-networking system 960 may enable users to interact with each other as well as receive content from third-party systems 970 or other entities, or to allow users to interact with these entities through an application programming interfaces (API) or other communication channels.

In particular embodiments, a third-party system 970 may include one or more types of servers, one or more data stores, one or more interfaces, including but not limited to APIs, one or more web services, one or more content sources, one or more networks, or any other suitable components, e.g., that servers may communicate with. A third-party system 970 may be operated by a different entity from an entity operating social-networking system 960. In particular embodiments, however, social-networking system 960 and third-party systems 970 may operate in conjunction with each other to provide social-networking services to users of social-networking system 960 or third-party systems 970. In this sense, social-networking system 960 may provide a platform, or backbone, which other systems, such as third-party systems 970, may use to provide social-networking services and functionality to users across the Internet.

In particular embodiments, a third-party system 970 may include a third-party content object provider. A third-party content object provider may include one or more sources of content objects, which may be communicated to a client system 930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 960 also includes user-generated content objects, which may enhance a user's interactions with social-networking system 960. User-generated content may include anything a user can add, upload, send, or "post" to social-networking system 960. As an example and not by way of limitation, a user communicates posts to social-networking system 960 from a client system 930. Posts may include data such as status updates or other textual data, location information, photos, videos, links, music or other similar data or media. Content may also be added to social-networking system 960 by a third-party through a "communication channel," such as a newsfeed or stream.

In particular embodiments, social-networking system 960 may include a variety of servers, sub-systems, programs, modules, logs, and data stores. In particular embodiments, social-networking system 960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 960 may also include suitable components such as network interfaces, security mechanisms, load balancers, failover servers, management-and-network-operations consoles, other suitable components, or any suitable combination thereof. In particular embodiments, social-networking system 960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 960 to one or more client systems 930 or one or more third-party system 970 via network 910. The web server may include a mail server or other messaging functionality for receiving and routing messages between social-networking system 960 and one or more client systems 930. An API-request server may allow a third-party system 970 to access information from social-networking system 960 by calling one or more APIs. An action logger may be used to receive communications from a web server about a user's actions on or off social-networking system 960. In conjunction with the action log, a third-party-content-object log may be maintained of user exposures to third-party-content objects. A notification controller may provide information regarding content objects to a client system 930. Information may be pushed to a client system 930 as notifications, or information may be pulled from client system 930 responsive to a request received from client system 930. Authorization servers may be used to enforce one or more privacy settings of the users of social-networking system 960. A privacy setting of a user determines how particular information associated with a user can be shared. The authorization server may allow users to opt in to or opt out of having their actions logged by social-networking system 960 or shared with other systems (e.g., third-party system 970), such as, for example, by setting appropriate privacy settings. Third-party-content-object stores may be used to store content objects received from third parties, such as a third-party system 970. Location stores may be used for storing location information received from client systems 930 associated with users. Advertisement-pricing modules may combine social information, the current time, location information, or other suitable information to provide relevant advertisements, in the form of notifications, to a user.

Figure 10:
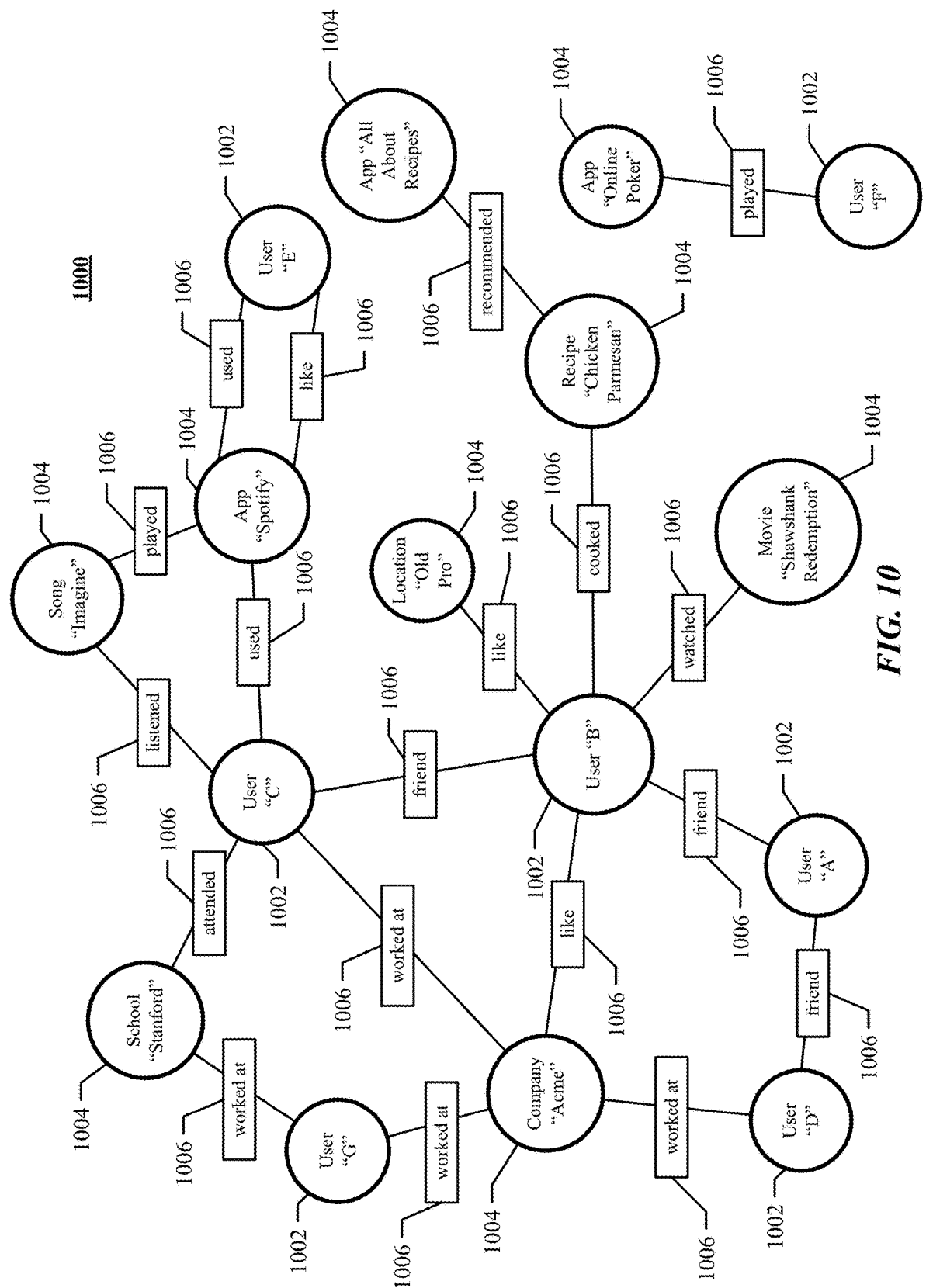
FIG. 10 illustrates an example social graph.

FIG. 10 illustrates example social graph 1000. In particular embodiments, social-networking system 960 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social-networking system 960, client system 130, or third-party system 970 may access social graph 1000 and related social-graph information for suitable applications. The nodes and edges of social graph 1000 may be stored as data objects, for example, in a data store (such as a social-graph database). Such a data store may include one or more searchable or queryable indexes of nodes or edges of social graph 1000.

In particular embodiments, a user node 1002 may correspond to a user of social-networking system 960. As an example and not by way of limitation, a user may be an individual (human user), an entity (e.g., an enterprise, business, or third-party application), or a group (e.g., of individuals or entities) that interacts or communicates with or over social-networking system 960. In particular embodiments, when a user registers for an account with social-networking system 960, social-networking system 960 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social-networking system 960. In particular embodiments, a user node 1002 may be associated with information provided by a user or information gathered by various systems, including social-networking system 960. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more webpages.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 960 or a third-party website associated with a web-application server); an entity (such as, for example, a person, business, group, sports team, or celebrity); a resource (such as, for example, an audio file, video file, digital photo, text file, structured document, or application) which may be located within social-networking system 960 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1004 may be associated with information of a concept provided by a user or information gathered by various systems, including social-networking system 960. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 960. Profile pages may also be hosted on third-party websites associated with a third-party system 970. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 970. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 960 a message indicating the user's action. In response to the message, social-networking system 960 may create an edge (e.g., a check-in-type edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 960 may send a "friend request" to the second user. If the second user confirms the "friend request," social-networking system 960 may create an edge 1006 connecting the first user's user node 1002 to the second user's user node 1002 in social graph 1000 and store edge 1006 as social-graph information in one or more of data stores 964. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 960 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 960 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 960 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social-networking system 960 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 130) may indicate that he or she likes the concept represented by the concept node 1004 by clicking or selecting a "Like" icon, which may cause the user's client system 130 to send to social-networking system 960 a message indicating the user's liking of the concept associated with the concept-profile page. In response to the message, social-networking system 960 may create an edge 1006 between user node 1002 associated with the user and concept node 1004, as illustrated by "like" edge 1006 between the user and concept node 1004. In particular embodiments, social-networking system 960 may store an edge 1006 in one or more data stores. In particular embodiments, an edge 1006 may be automatically formed by social-networking system 960 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 960). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 960 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 960) or RSVP (e.g., through social-networking system 960) to an event associated with the advertisement. In addition or as an alternative, an advertisement may include social-networking-system content directed to the user. As an example and not by way of limitation, an advertisement may display information about a friend of the user within social-networking system 960 who has taken an action associated with the subject matter of the advertisement.

In particular embodiments, social-networking system 960 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 970 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 960 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 960 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 960 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 960 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 960 may calculate a coefficient based on a user's actions. Social-networking system 960 may monitor such actions on the online social network, on a third-party system 970, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 960 may calculate a coefficient based on the user's actions with particular types of content. The content may be associated with the online social network, a third-party system 970, or another suitable system. The content may include users, profile pages, posts, news stories, headlines, instant messages, chat room conversations, emails, advertisements, pictures, video, music, other suitable objects, or any combination thereof. Social-networking system 960 may analyze a user's actions to determine whether one or more of the actions indicate an affinity for subject matter, content, other users, and so forth. As an example and not by way of limitation, if a user frequently posts content related to "coffee" or variants thereof, social-networking system 960 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 960 may calculate a coefficient based on the type of relationship between particular objects. Referencing the social graph 1000, social-networking system 960 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 960 may determine that the user has a higher coefficient with respect to the first photo than the second photo because having a tagged-in-type relationship with content may be assigned a higher weight and/or rating than having a like-type relationship with content. In particular embodiments, social-networking system 960 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 960 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 960 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 960 may determine that the user has a higher coefficient for the airport than the gas station based on the proximity of the airport to the user.

In particular embodiments, social-networking system 960 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 960 may provide information that is relevant to user's interests and current circumstances, increasing the likelihood that they will find such information of interest. In particular embodiments, social-networking system 960 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 960 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 960 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 970 (e.g., via an API or other communication channel), or from another suitable system. In response to the request, social-networking system 960 may calculate the coefficient (or access the coefficient information if it has previously been calculated and stored). In particular embodiments, social-networking system 960 may measure an affinity with respect to a particular process. Different processes (both internal and external to the online social network) may request a coefficient for a particular object or set of objects. Social-networking system 960 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 960 or shared with other systems (e.g., third-party system 970). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 970, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 962 may be authorization/privacy servers for enforcing privacy settings. In response to a request from a user (or other entity) for a particular object stored in a data store 964, social-networking system 960 may send a request to the data store 964 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 964, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 11:
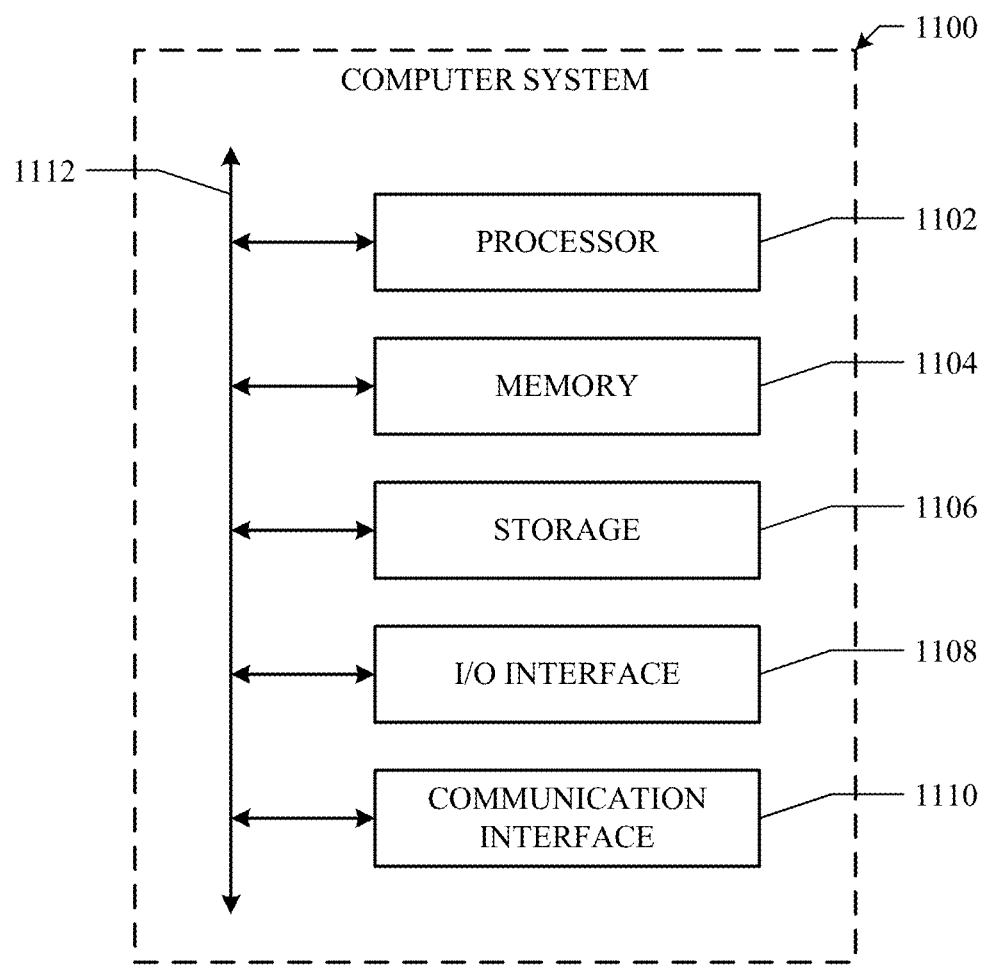
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, receiving, from a first client device, a registration request that includes identification information for a service to be provided at a service location and identification information for the first client device;
   by the computing device, sending, to the first client device, a command to enable location reporting, wherein the command instructs the first client device to continually transmit the location information of the first client device;

by the computing device, adding the first client device to a waiting queue for the service, wherein the waiting queue comprises one or more client devices;

by the computing device, determining a target service time for the first client device based on location information of the first client device and status information received from the client devices in the queue, wherein the location information is received from the first client device through the data communication networks, and wherein the status information comprises an indication that a client device is being serviced; and by the computing device, sending, to the first client device, through the data communication networks, a notification regarding the target service time.

2. The method of claim 1, wherein the command instructs the first client device to make itself discoverable to Bluetooth Low Energy (BLE) beacons in a pre-determined area.

3. The method of claim 1, wherein the location information comprises coordinates based on:
GPS satellite signals; or
Indoor Positioning System (IPS) signals.

4. The method of claim 1, wherein the determining the target service time for the first client device based on location information received from the first client device and status information received from the client devices in the queue comprises:
calculating an estimated service duration for the first client device;
identifying a service time gap in the queue based on current location information for each of the client devices in the queue, wherein the service time gap can accommodate the estimated service duration based on the location information received from the first client device;
inserting the first client device into the queue based on the service time gap;
adjusting the position of the first client device in the waiting queue by comparing the estimated arrival time of the first client device and the estimated arrival times of the other client devices in the waiting queue; and
determining the target service time for the first client device based on the position of the first client in the waiting queue, estimated service duration for each client device in the waiting queue and a number of service personnel at the service location.

5. The method of claim 4, wherein calculating the estimated arrival time of the first client device is further based on an estimated time to complete current activity, wherein the current activity is associated with the location indicated in the location information received from the first client device.

6. The method of claim 1, wherein the status information comprises location information.

7. The method of claim 1, further comprises:
receiving, from a second client device that is in the waiting queue, status information, wherein the status information comprises location information;
calculating an estimated arrival time of the second client device to the service location based on the status information; and
adjusting the position of the second client device in the waiting queue based on the status information received from the second client device and status information received from the client devices in the queue.

8. The method of claim 1, wherein the status information comprises a notification that a client device is cancelling registration for the service.

9. The method of claim 1, further comprising:
receiving, from a second client device that is in the waiting queue, status information, wherein the status information comprises a notification that the second client device is cancelling registration for the service; and
removing the second client device from the waiting queue.

10. The method of claim 1, wherein the status information comprises a notification that a client device is being delayed for the service.

11. The method of claim 1, further comprising:
receiving, from a second client device that is in the waiting queue, status information, wherein the status information comprises a notification that the second client device is being delayed for the service; and
adjusting the position of the second client device in the waiting queue based on the status information received from the second client device and status information received from the client devices in the queue.

12. The method of claim 1, wherein the status information comprises an indication of service completion.

13. The method of claim 1, further comprising:
receiving, from a second client device that is in the waiting queue, status information, wherein the status information comprises an indication of service completion; and
removing the second client device from the waiting queue.

14. The method of claim 1, further comprising:
receiving, from a second client device that is in the waiting queue, status information, wherein the status information comprises an indication that the second client device is being served; and
adjusting the position of the second client device in the waiting queue to the front of the waiting queue, and changing an attribute of the second client device to indicate that the second client device is not to be moved back in the waiting queue.

15. One or more computer-readable non-transitory storage media embodying software comprising instructions operable when executed to:
receive, from a first client device, a registration request that includes identification information for a service to be provided at a service location and identification information for the first client device;
send, to the first client device, a command to enable location reporting, wherein the command instructs the first client device to continually transmit the location information of the first client device;
add the first client device to a waiting queue for the service, wherein the waiting queue comprises one or more client devices;
determine a target service time for the first client device based on location information of the first client device and status information received from the client devices in the queue, wherein the location information is received from the first client device through the data communication networks, and wherein the status information comprises an indication that a client device is being serviced; and
send, to the first client device, through the data communication networks, a notification regarding the target service time.

16. A system comprising one or more processors and a memory coupled to the processors comprising instructions executable by the processors, the processors being operable when executing the instructions to:
- receive, from a first client device, a registration request that includes identification information for a service to be provided at a service location and identification information for the first client device;
- send, to the first client device, a command to enable location reporting, wherein the command instructs the first client device to continually transmit the location information of the first client device;
- add the first client device to a waiting queue for the service, wherein the waiting queue comprises one or more client devices;
- determine a target service time for the first client device based on location information of the first client device and status information received from the client devices in the queue, wherein the location information is received from the first client device through the data communication networks, and wherein the status information comprises an indication that a client device is being serviced; and
- send, to the first client device, through the data communication networks, a notification regarding the target service time.

* * * * *